United States Patent [19]
Reid

[11] 4,455,232
[45] Jun. 19, 1984

[54] METHOD AND APPARATUS FOR INDUCED-FLOW CIRCULATION AND PRESSURIZED AERATION IN A BARRIER OXIDATION DITCH

[76] Inventor: John H. Reid, 7 Stansbury Ct., Fredericksburg, Va. 22401

[21] Appl. No.: 361,205

[22] Filed: Mar. 24, 1982

Related U.S. Application Data

[63] Continuation-in-part of Ser. No. 75,412, Sep. 14, 1979, Pat. No. 4,394,268, Ser. No. 28,383, Apr. 9, 1979, Pat. No. 4,278,547, Ser. No. 282,592, Jul. 13, 1981, Ser. No. 848,705, Nov. 4, 1977, abandoned, Ser. No. 355,150, Mar. 5, 1982, Ser. No. 957,432, Nov. 3, 1978, Pat. No. 4,260,486, and Ser. No. 28,386, Apr. 9, 1979, which is a continuation of Ser. No. 649,995, Jan. 19, 1976, abandoned.

[51] Int. Cl.³ .............................................. C02F 3/20
[52] U.S. Cl. ................................. 210/628; 210/194; 210/220; 210/926; 210/629; 261/93; 261/DIG. 75
[58] Field of Search ............... 210/926, 219, 220, 620, 210/621, 628, 629, 194, 320, 197, 195.3, 195.4; 261/93, DIG. 75, 91, 124

[56] References Cited

U.S. PATENT DOCUMENTS 4,260,486  4/1981  Reid .................................. 210/926
4,278,547  7/1981  Reid .................................. 210/926

FOREIGN PATENT DOCUMENTS 2300373  7/1973  Fed. Rep. of Germany ...... 210/926
166160   8/1974  Hungary ............................. 210/926
1421668  1/1976  United Kingdom ................ 210/219

*Primary Examiner*—Benoît Castel
*Attorney, Agent, or Firm*—Marion P. Lelong; William H. Murray

[57] ABSTRACT

A barriered circulator/aerator in the endless channel of a barrier oxidation ditch provides a directly pumped flow of mixed liquor into a central liquor inlet zone and an energy-release induced flow of mixed liquor into a surrounding liquor inlet zone at the inlet of a deep oxygen contact duct which passes beneath the barrier to the discharge channel on the downstream side thereof. It further provides mixing of diffused air with the directly pumped flow and/or the induced flow and then moving the combined air-liquor flows into the deepest portion of the contact duct where point-source pressurized aeration of both flows occurs. Eddy jet diffusers are preferably used for aerating the induced flow. Oxygen transfer efficiencies are obtained that are 1.6–2.2 times as great per brake horsepower per hour as that attainable by 100% pumping of the mixed liquor in a total barrier oxidation ditch, as disclosed in U.S. Pat. No. 4,260,278.

14 Claims, 23 Drawing Figures

METHOD AND APPARATUS FOR INDUCED-FLOW CIRCULATION AND PRESSURIZED AERATION IN A BARRIER OXIDATION DITCH

CROSS REFERENCE TO RELATED APPLICATIONS

This application is a continuation-in-part of: Ser. No. 75,412, filed Sept. 14, 1979, entitled "Conversion of Plug Flow and Complete Mix Aeration Basins to Barrier Oxidation Ditches" and now U.S. Pat. No. 4,394,268; of Ser. No. 28,383, filed Apr. 9, 1979, entitled "Conservation of Momentum in a Barrier Oxidation Ditch" and now U.S. Pat. No. 4,278,547, issued July 14, 1981 and of its divisional application Ser. No. 06/282,592, filed July 13, 1981; of Ser. No. 848,705, filed Nov. 4, 1977, entitled "Flow Control Apparatus and Process for an Oxidation Ditch" of John Hager Reid, and now abandoned; of its continuation application, Ser. No. 355,150, filed Mar. 5, 1982; of its divisional application, Ser. No. 957,432, filed Nov. 3, 1978 and now U.S. Pat. No. 4,260,486 issued Apr. 7, 1981; and of Ser. No. 28,386, filed Apr. 9, 1979 now abandoned, which is a continuation of Ser. No. 649,995, filed Jan. 19, 1976, entitled "Flow Control Apparatus and Method for Aerobic Sewage Treatment" of John Hager Reid, now abandoned.

BACKGROUND OF THE INVENTION

1. Field of the Invention

This invention relates to gas-liquid contacting devices and the use of such devices in wastewater treatment. The invention especially relates to methods and apparatuses for aerating and pumping in activated sludge processes, particularly when conducted in oxidation ditches of racetrack or loop channel configuration.

2. Review of the Prior Art

Many liquid waste treatment processes, commonly termed aerobic processes, supply bacteria and other microorganisms with dissolved oxygen for treating aqueous wastes such as municipal sewage, tannery wastes, dairy wastes, meat-processing wastes, and the like.

One such aerobic process is the activated sludge process, in which the microorganisms are concentrated as an activated sludge to be mixed with incoming wastewater, which supplies food for the organisms. The apparatuses in which the activated sludge process is conducted comprise an aeration basin (reactor basin) and a final clarifier (settling tank). The aeration basin serves as a culturing basin in which to generate the growth of bacteria, protozoa, and other types of microorganisms, so that they can consume the pollutants in the raw waste entering the basin by converting the pollutants into energy, carbon dioxide, water, and cells (biomass).

The activated sludge process is effective for controlling this conversion activity within the aeration basin, for settling the biomass within the clarifier, for overflowing the purified liquor or effluent from the clarifier to discharge, and for returning the settled biomass from the clarifier to the aeration basin. Thus the activated sludge process is a suspended-growth, aerobic, biological treatment process, using an aeration basin and a settling tank, which is capable of producing very pure, high quality effluent, as long as the biomass settles properly.

It can thus be compared to a fixed-growth process wherein the growth of the biomass occurs on or within a tower on plastic media or in a trickling filter on rocks packed therewithin.

Objectives of aerobic wastewater treatments with the activated sludge process include removal of biochemical oxygen demand (BOD), phosphorus removal, $NH_3$-Nitrogen removal (preferably by nitrification, in which $NH_3$ is converted to $NO_2$ and $NO_3$ ions), $NO_3$-Nitrogen removal (preferably by denitrification, in which $NO_2$ and $NO_3$ ions are utilized as oxygen sources and the incoming waste as a carbon and energy source), minimum usage of chemicals and energy, and minimum manpower requirements.

The activated sludge process is represented by two prime mixing regimes, plug flow and complete mixing, which represent the opposite extremes of a continuum and almost infinite variety of intermediate mixing modes.

Plug flow mixing characteristically occurs in a long, narrow aeration basin into which wastewater and return sludge are fed at the inlet end to form a dilute mixed liquor which flows toward the outlet end while oxygen is being introduced and the biomass is rapidly increasing. At the outlet end, the mixed liquor passes to a clarifier. A portion of the recovered sludge, as clarifier underflow, is pumped to the inlet end. Plug flow systems are characterized by gradients in dissolved oxygen(D.O.) and oxygen uptake rate of their mixed liquor which is inherently dominated volumetrically by the inflowing wastewater so that temporary or cyclic variations in wastewater characteristics, such as unusually large quantities of materials poisonous to microorganisms, can cause shock loadings that can at least temporarily inactivate the system. There are many hybrid systems (semi-plug flow) in which the waste and/or the sludge are admitted at intervals along the channel.

Complete mixing is commonly conducted in a round or square tank or basin into which incoming wastes are fed at numerous places while the contents are being vigorously mixed and aerated so that the wastes are rapidly dispersed throughout the tank. The volume of mixed liquor is so much greater than the volume of the incoming wastewater that the mixed liquor overwhelmingly dominates the wastewater.

Thus there is a relatively uniform food/microorganism ratio existing in such complete-mix tanks. Also, there is a uniform concentration of mixed liquor suspended solids (MLSS) to be found in complete mix aeration tanks as contrasted with the variable concentration noted in the plug flow and semi-plug flow tanks.

Both plug flow mixing (with respect to its food supply and dissolved oxygen content) and complete mixing (with respect to all added materials at the points of introduction) additionally occur cyclically within single-stage systems, commonly termed oxidation ditches, having an endless channel within which the numerous species of microorganisms in its mixed liquor go through breathing, feeding, and resting cycles each 3-10 minutes, depending upon channel length, temperature, flow velocity, food supply, and the like. The biomass in the mixed liquor is maintained at a high level of abundancy (such as 3,000-6,000 mg/l), so that oxygen tends to be quickly consumed within the aerobic portion of the channel.

These microorganisms in circuit flow within the endless channels of oxidation ditches can also be supplied with sufficient oxygen within the aerobic portion that nitrite and nitrate ions can be formed from ammonia, which is derived from broken-down proteins, and then can be sufficiently deprived of oxygen during a second portion of the cyclic flow that the nitrite ions and nitrate ions and/or sulfate ions are used as their sources of oxygen by certain species of microorganisms, provided that a carbon-supplying food source, such as methanol or incoming wastewater, is also available. This process causes nitrogen to be liberated from the mixed liquor as bubbles of gas and is termed denitrification.

However, if temperature, biomass concentration, food supply, oxygen supply, and the like should change so that the aerobic portion of the endless channel is increased in length at the expense of the anoxic portion thereof (within which denitrification occurs), denitrification can continue while the withdrawn mixed liquor is being clarified. The unfortunate result is that nitrogen bubbles can rise within the clarifier and seriously interfere with settling of the biomass to form sludge and clarified liquor.

Aerators used in activated sludge systems include bubble diffusers, mechanical surface aerators (both high speed and low speed), submerged turbine aerators, horizontal rotors, and gas-liquid jet aerators, such as eddy jets. The horizontal rotors may be fixed, adjustable in height, or floating and may be fitted with brushes, blades, cages or discs. "Submerged turbine aerator" is a term used in the wastewater treatment industry to describe a mixing device which comprises one or more axial-flow propellers or radial-flow impellers, in which compressed air or high-purity oxygen is diffused through a sparge device, located downstream of the propellers or impellers, which are attached to a vertically disposed shaft within a vertically disposed discharge or intake duct.

Only vertically mounted low-speed mechanical surface aerators, horizontally mounted rotor aerators with brushes, blades, cages, or discs, and jet aerators had been usable in oxidation ditches until the invention of the barrier oxidation ditch, as disclosed in Ser. No. 649,995, filed Jan. 19, 1976 and now abandoned, and in Ser. No. 848,705, filed Nov. 4, 1977 and now abandoned, both of which describe means for mounting and utilizing submerged turbine aerators within a deep oxidation ditch having a barrier athwart the channel, and both of which are incorporated herein by reference.

It is pertinent to note that a conventional circuit-flow oxidation ditch of the prior art operates as a complete mix system except that its D.O. gradient is characteristically plug flow. Circulation of the entire basin contents during each cycle, while admixing the mixed liquor with the relatively minor stream of inflowing wastewater, ensures such complete-mix conditions.

Although it could be stretched out so that its racetrack or looped channel would be a mile in length, for example, whereby the circuit flow in its channel would be comparable to that of the inflowing wastewater in volume, such as 1:1 to 3:1, thereby simulating a true plug flow activated-sludge system, it would then be subject to shock-load effects, the food-to-microorganism ratio in the waste inlet portion being so high that the microorganisms could readily be overwhelmed by incoming poisons or other changes in the food situation. Preferably, therefore, an oxidation ditch is sufficiently short that its channel flow of mixed liquor is ample to dilute the inflowing wastewater by volume ratios of 100:1 to 200:1 or greater, whereby the inflowing wastewater is completely dominated volumetrically by the mixed liquor in the ditch and the food-to-microorganism ratio is low enough that the microorganisms can handle any reasonable change in food properties, thereby simulating a true complete mix system.

At such desirable volume ratios, an oxidation ditch can be designed to operate with recycled sludge within its channel on a food-to-microorganism ratio (F/M) by weight that varies over a possible range of 0.01 to 5.0, depending upon space, cost, and process design requirements, by varying the concentration of microorganisms, expressed as mixed liquor suspended solids (MLSS), flowing within its channel. If operating at a low F/M ratio of 0.01–0.2, it is an extended aeration system, producing small quantities of sludge. If operating at a medium F/M ratio of 0.2–0.5, it is a conventional system. If operating at a high F/M ratio of 0.5–2.5, it is a high-rate activated sludge system, producing large quantites of sludge. Moreover, it can even be operated as an aerated lagoon with no recycle sludge at F/M ratios above 2.5, but it is then not operating according to the activated sludge process and is, therefore, not herein defined as an oxidation ditch.

An oxidation ditch may also shift through a wide F/M range, representing all three of these systems, as it begins operation as a high-rate activated sludge system, with no built-up sludge, and gradually builds up its recycled sludge to a mixed liquor suspended solids (MLSS) content of 3,000 mg/l where extended aeration can generally be considered to begin. In general, an oxidation ditch is considered for design purposes to exist when the MLSS content reaches about 1500 mg/l, because at lower levels the size of the ditch would have to be excessive, but the principles of its operation are nevertheless applicable at much lower MLSS levels, such as at 1,000 mg/l.

It is significant that increasing the concentration of the microorganisms increases the total amount of oxygen used in an oxidation ditch of given volume and necessitates a higher flow velocity to maintain the greater mass of solids in suspension. At a given rate of food inflow (F), increasing the concentration (M) of microorganisms obviously decreases the F/M ratio. A change in the F/M ratio also affects the $O_2$ transfer rate (measured as pounds of oxygen per hour at process conditions) for which the ditch must be designed, as is known in the art. For example, using F/M to represent food content as pounds of five-day biochemical oxygen demand, BOD(5), per pound of microorganisms, O/F to represent pounds of oxygen per pound of BOD(5), and O/M to represent pounds of oxygen per pound of microorganisms, the following approximate relationships are known in the art:

| Type of activated sludge process | Sludge age, days | Excess biological solids (cells) produced per lb. BOD(5) applied | Typical MLSS content mg/l | F/M | O/F | O/M |
|---|---|---|---|---|---|---|
| High rate load | 0.5–2 | >1 | 500–1000 | 1.0 | 0.7 | 0.7 |
| Conventional load | >2 <6 | 1 > 0.35 | >1000 <3000 | 0.3 | 1.0 | 0.3 |
| Extended aeration | >6 <20 | <0.35 >0.2 | >3000 <5000 | 0.1 | 1.2 | 0.12 |
| Low load extended aeration (typical | >12 | <0.2 | >3000 | 0.05 | 1.5 | 0.08 |

| Type of activated sludge process | Sludge age, days | Excess biological solids (cells) produced per lb. BOD(5) applied | Typical MLSS content mg/l | F/M | O/F | O/M |
|---|---|---|---|---|---|---|
| for oxidation ditch) | | | | | | |

In order to remove nitrogen from a wastewater, in which it may be measured as total nitrogen or total Kjeldahl nitrogen, all systems using the wastewater as the chief organic carbon source for denitrification employ an alternating aerobic-anoxic sequence of stages, without intermediate clarification, to effect total nitrogen removal while attempting to avoid ammonia nitrogen bleedthrough. An oxidation ditch can be used for this purpose by controlling the level of aeration so that the mixed liquor is recirculated many times through alternating aerobic and anoxic zones prior to discharge from the channel of the ditch. To operate effectively, however, it is important that both zones be uninterrupted; i.e., aeration should occur at a single location immediately preceding the aerobic zone and should not recur until at least the end of the anoxic zone.

If aeration occurs at only one location, so that there follows downstream thereafter one and only one aerobic zone, one and only one anoxic zone, and, if desired, an oxygen-deficient zone within the channel of the ditch, it is herein defined as "point-source aeration". If there are multiple zones of each type, it is defined as "multi-source aeration".

"Point-source aeration", "point-source mixing", and "point-source propulsion" are terms signifying that these three properties (hereinafter generally termed "point-source treatment") each originate at a single location within the channel of an oxidation ditch, in contrast to multiple locations therefor.

A precursor of the oxidation ditch is described in U.S. Pat. No. 1,247,542 of Jones (1917). It has a racetrack-shaped channel, a plurality of baffles disposed across the channel, and air diffusers on the downstream side of each baffle, thereby creating eddy-type flow between nearby baffles.

A system that is superficially similar in plan view is shown in U.S. Pat. No. 1,643,273 of Imhoff (1927). It comprises a pond in which fish may be raised, a ditch which is connected to the pond at each end, an inlet to the ditch for sewage which has passed through a settling basin, and a pump device in the ditch for withdrawing clean water from the pond so that it may dilute the settled sewage before it is fed to the pond. The pump device comprises a baffle which is disposed athwart the ditch, a passage beneath the baffle, and an airlift pump alongside the baffle so that its operation pulls the water through the passage. It does not utilize the activated sludge process because there is no mixed liquor in the ditch. Most of the oxygen transfer occurs by algae activity in the pond, and the intake D.O. content is generally high so that the pump is not intended to function primarily as an $O_2$ transfer device. In addition, because the pond itself functions as a barrier, there is no induced flow approaching the pump.

The first oxidation ditch was invented by Dr. Ir. A. Pasveer and is described in Netherlands Pat. No. 87,500 and British Pat. No. 796,438 (1958). The mixed liquor in its racetrack-shaped channel is aerated and propelled by a horizontally disposed brush-type rotor, which acts as a booster pump for the mixed liquor flowing therebeneath. Clarifying is performed intermittently within the channel.

An oxidation ditch of conventional shape, with a post-sedimentation reservoir or clarifier therewithin for sewage treatment is described in U.S. Pat. No. 3,421,626 of Schramm et al (1969). Two rotors are operated within the endless channel during dry weather. When excessive rainfall occurs, the rotors are stopped, and the channel of the oxidation ditch becomes a preliminary settling basin.

An oxidation ditch in which the mixed liquor is agitated, aerated, and propelled by a shrouded drum having rotor blades is described in U.S. Pat. No. 3,452,873 of Blough (1969) for disposing of livestock manure.

The Pasveer oxidation ditch was improved in Holland by deepening the ditch, separating the straight reaches of its endless channel with a thin partition, and installing a vertically mounted, low-speed mechanical surface aerator at an end of the partition, as disclosed in U.S. Pat. No. 3,510,110 of Klein (1970). Depths of up to 16 feet are feasible. A complete mix zone is created around the aerator, and booster-type pumping occurs when a portion of the toroidal flow strikes the partition and is converted into a slowly spiralling downstream flow. Clarification occurs continuously in a separate vessel, with a portion of the sludge being returned to the oxidation ditch. This system is marketed under the trademark "Carrousel".

A multichannel oxidation ditch, in which discs mounted on a common shaft act as pump/aerators for sewage treatment, is described in U.S. Pat. No. 3,579,439 of Meiring et al (1971). The mixed liquor flows sequentially from one concentrically disposed channel to the other. The channels can be operated for nitrification and denitrification by controlling the amount of flow between the channels and the settling tanks.

An inverted funnel is suggested in U.S. Pat. No. 3,643,403 by Speece (1972) for aerating oxygen deficient water by countercurrent flow with ascending air bubbles.

An oxidation trench having a longitudinally disposed partition and a vertical discharge duct in the middle of the partition or at one or both of its ends, with the inlet of the duct being at the bottom of the partition and at one side thereof and the discharge duct and outlet at the other side, is described in German Patent No. 2,300,273 (1973). A mechanical surface aerator is vertically mounted within the outlet. It provides merely one half of its propulsive force for use in the discharge channel in each direction if its pump/aerator is disposed in the middle of the partition. It is, moreover, subject to short circuiting or backmixing if the pump/aerator is nearer to one end.

An elongated oxidation ditch of looped-channel configuration, in which the mixed liquor is circulated directly through the cooling condensers of an electric power generating plant by a single rotor equipped with discs, is described in U.S. Pat. No. 3,760,946 of Boler (1973).

An oxidation ditch of the looped-channel type which is used as a channeled algae pond, in which the liquid is propelled and agitated by a plurality of horizontally disposed cage aerators or aeration brushes, is described in U.S. Pat. No. 3,839,198 of Shelef (1974).

Circular and elongated oxidation ditches in which the mixed liquor is aerated and propelled by banks of jet ejectors are described in U.S. Pat. Nos. 3,846,292 of Lecompte, Jr. (1974); 3,897,000 of Mandt (1975); and 4,199,452 of Mandt (1980).

A denitrification process for use in oxidation ditches having a vertically mounted mechanical surface aerator at one or both ends of a longitudinally disposed partition is described in U.S. Pat. No. 3,900,394 of Rongved (1975).

An oxidation ditch utilizing the aeration rotor of U.S. Pat. No. 3,759,495 of Boler et al (1973) is described in U.S. Pat. No. 3,905,904 of Cherne et al (1975).

An oxidation ditch which includes a bank of venturi-type ejectors is described in U.S. Pat. No. 3,990,974 of Sullins (1976). A dissolved oxygen sensor controls pumping of liquor through the ejectors and thereby the quantity of air sucked from above the liquor level into the throats of the ejectors. Banks of vertical settler tubes are also disposed at one end of the oxidation ditch to effect settling of particles after impingement upon the inside surfaces of the tubes.

An oxidation ditch having a transversely disposed barrier across the channel is described in Hungarian Pat. No. 166,160 (1976) and Austrian Pat. No. 339,224 (1977), the barrier being traversed by a discharge duct containing a smaller duct within which an axial-flow impeller is disposed, whereby the smaller duct discharges within the larger one and functions as an upwardly discharging jet ejector.

A pair of oxidation troughs, each equipped with a drum-type rotor, is connected in series with (1) an aerated buffer vessel to receive incoming waste, (2) an aerated high-capacity tank for mixing the pre-aerated waste with return sludge and for feeding the pair of oxidation troughs and (3) a clarifier for receiving effluent from the troughs, as is described in U.S. Pat. No. 4,138,328 of Schnitzler (1979).

An oxidation ditch utilizing surface aerators is disclosed in U.S. Pat. No. 4,159,243 of O'Key (1979). The disclosed oxygen concentration is measured at two or more points in the endless channel and the aerators are controlled accordingly to produce desired lengths of oxic and anoxic zones.

An oxidation ditch is taught in U.S. Pat. No. 4,269,709 of Rongved (1981). It comprises a surface aerator adjacent one end of a dividing wall and a tilted partition attached to the same end for deflecting and accelerating the flow of liquor, whereby damage to flocs by destructive turbulence is minimized.

An oxidation ditch utilizing rotors for surface aeration of its mixed liquor is described in U.S. Pat. No. 4,285,818 of Muskat (1981). One rotor operates within a gas-tight cover having selectively operated flaps which are closed while oxygen is admitted after dissolved-oxygen probes have detected an undesirably low level of dissolved oxygen within the channel.

An oxidation ditch utilizing a surface aerator and having a clarifier disposed in the endless channel, so that the mixed liquor flows therebeneath, is described in U.S. Pat. No. 4,303,516 of Stensel et al (1981).

As of 1975, there were more than 500 municipal oxidation ditch installations of the horizontal rotor type in the United States and 90 in Canada, and there were 154 Carrousel installations in the world, according to "A Comparison of Oxidation Ditch Plants to Competing Processes for Secondary and Advanced Treatment of Municipal Wastes", by W. F. Ettlich, EPA-600/2-78-051, March 1978, National Technical Information Service, Springfield, Va., 22161. In this publication, these oxidation ditch plants are stated to provide flexibility in operation, a stable sludge, and performance above the average of all other competing secondary processes. Oxidation ditch plants were also found to be very competitive in operation and maintenance cost and to provide nitrogen removal at no additional cost.

However, these prior art oxidation ditches have many design and operational problems. Except for the jet ejector types, the pump/aerator devices of all prior art oxidation ditches produce spray and mist which create slippery walkways, because of algae growth in summer and freezing in winter, and also cause excessive ice formation on the aeration equipment in winter. Enhancing the surface area of liquor exposed to cold air further causes a loss of heat from the system and a reduction in reaction rates.

It is conventional practice in prior art oxidation ditches that their pump/aerators furiously aerate a portion of their liquor, while allowing the remainder to flow past untouched, and then the aerated and unaerated portions of the mixed liquor blend somewhere downstream of the pump/aerators to produce the desired dissolved oxygen content. From a hydraulic viewpoint, this practice can be termed "booster pumping", because the pump merely accelerates or adds energy to the mass of liquor flowing past the pump.

Such booster pumping seems to have developed because designers of prior art oxidation ditches have apparently believed that the kinetic energy in the induced-flow liquor is an asset that should not be interfered with. They have accordingly designed their ditches for booster pumping with single devices that combine the functions of pumping and aerating, whereby the momentum of the flowing liquor is merely augmented with each circuit-flow movement past the pump/aerator. Because the pumping function requires a relatively small input of energy, the principal capability of these devices is the aerating function. However pumping and aerating functions cannot be utilized independently.

In consequence, a multi-component price has had to be paid for this value judgment as to the importance of kinetic energy. These price components can be enumerated as follows:

(a) Backpumping of some liquor occurs from the discharge side to the intake side of the pump/aerator, so that a portion of the liquor must be pumped more than once.

(b) Backmixing of an aerated portion of the backpumped liquor also occurs. The result is that this portion of the backpumped liquor which contains relatively high levels of dissolved oxygen must be aerated again and at a lower oxygen transfer rate. In addition, because prior art systems are designed to aerate a fraction of the flow rather than all of it, when the backmixed liquor is being aerated a second time, the already aerated backmixed liquor is displacing an equal volume which cannot be aerated the first time.

(c) Heterogeneous aeration occurs when unaerated induced-flow liquor blends with highly aerated liquor to produce a blended downstream liquor having a desired average dissolved-oxygen content. Such heterogeneous aeration requires more energy than homogeneous aeration to the same dissolved-oxygen content.

(d) Propulsion limitations occur when a portion of the liquor bypasses the pump/aerator, without being contacted or even directly influenced by the device, and is instead induced to flow by momentum. This induced-flow liquor is susceptible to being retarded or held back whenever the backpressure or frictional head becomes excessive. As a practical matter, such excessive friction is likely whenever attempting to operate an oxidation ditch at very high levels of MLSS ($\approx$10,000 mg/l or ppm), for the higher the mixed liquor solids level, the higher the density and viscosity.

(e) Inflexibility of operation occurs because the aerating and pumping functions of the pump/aerator are performed simultaneously by the same prior art device, whereby changing the submergence or the rotational speed of a pump/aerator simultaneously affects both aerating and pumping functions.

The inability to prevent backpumping of liquor from the discharge side toward the intake side of the aerator imposes a slight additional energy demand upon the system.

The inability to prevent backmixing of aerated mixed liquor with unaerated liquor is believed to be more serious. Backmixing causes smaller quantities of oxygen to be transferred into the mixed liquor for a specific exposure of mixed liquor to air. Therefore, additional energy is required to attain a desired D.O. content because oxygen is a slightly soluble gas in water and the necessary driving force increases non-linearly as the dissolved-oxygen content increases, according to the equation:

$$dC/dt = K(C_s - C)$$

where, at the temperature of oxygen transfer:
C = initial oxygen concentration,
t = time,
$C_s$ = saturation concentration of oxygen, and
K = the overall gas mass transfer coefficient (time $-1$); it is a function of the resistance of the films and the area of liquid-gas interface per unit volume of liquid.

As may be appreciated from FIG. 1, the rate of oxygen transfer, from bubbles of an oxygen-containing gas, such as air, to water, is a tangent, dC/dt, to the solubility curve plotted from this equation (for initially deaerated water at 4° C. and an atmospheric pressure of 14.54 psi) at any time, t. If unaerated water is aerated, the initial slope is quite steep, such as line A in FIG. 1 (equalling 4.0 in the units as shown). If backmixing occurs so that a mixture of aerated and unaerated water is aerated, the slope is much shallower, such as line B in FIG. 1 (equalling 1.1). If heavily aerated water reaches the aeration device, the slope can be very shallow, such as line C in FIG. 1 (equalling 0.53). It should, therefore, be quite clear that, with a given input of energy, backmixing will cause a considerably smaller quantity of oxygen to be transferred into a parcel of water, as compared to the situation for aeration of unaerated water. Designers of prior art oxidation ditches, complete mix systems, and plug flow systems appear to have ignored the high cost of backmixing and even its very existence.

The inability of prior art oxidation ditches to prevent heterogeneous aeration, which occurs when highly aerated mixed liquor is blended with unaerated liquor, is also believed to be important. As can be appreciated by a glance at FIG. 1, when a quantity of aerated liquor having an oxygen concentration of 13.6 mg/l and an oxygen transfer rate C, after cumulative aerating for 10 minutes, is blended with an equal quantity having an oxygen concentration of zero and an oxygen transfer rate A, at zero aerating time, to produce a mixture having an oxygen content of 6.8 mg/l and an average cumulative oxygen transfer rate D (equalling 1.9), an average cumulative time of 5.0 minutes is spent on the entire blend, i.e., more energy is expended than would be required for homogeneously aerating up to slope D at cumulative time (equalling 2.7 minutes). Expressed in other terms, aerating the entire quantity at 0.0 starting D.O. for 5.0 minutes imparts 9.9 mg/l to the liquid. The difference between 9.9 and 6.8 represents a significant energy wastage when using the curve shown in FIG. 1 which is characteristic of one type of pump/aerator, as an example.

The practical effect in a prior art oxidation ditch of both backmixing and heterogeneous aeration, in combination, may be appreciated by considering FIG. 2. The upper portion of this schematic flow chart relates to backmixing of aerated liquor to the aerator, and the lower portion relates to heterogeneous aeration which occurs when unaerated liquor flows past the aerator and blends with aerated liquor somewhere downstream of the aerator. The combined effect of these prior art process characteristics is to force the final aeration time, t, to shift a significant distance along the aeration curve for the liquor, as illustrated by moving from the relatively steep tangent D to the shallower tangent B or even C in FIG. 1.

Propulsion limitations are often interrelated with equipment characteristics. For example, the vertically mounted low-speed mechanical surface aerators used in the Carrousel system cannot be mounted side by side and cannot be built to a size greater than 150 horsepower. In consequence, these pump/aerators must be mounted within a relatively narrow channel so that circulation capacity of the channel is limited. They are further limited as to deliverable head because liquor that is near the outer wall and near the bottom of the channel is not pumped but is induced to flow by momentum and by proximity to the pumped liquor. This induced-flow liquor is, therefore, suseptible to being retarded or held back if the frictional head is excessive. In consequence, the Carrousel system has utilized a plurality of mechanical surface aerators at ends of partitions in a looped channel configuration, operating as booster pumps in series, for large oxidation ditches. The Carrousel system is presently marketed in the United States by Envirotech Corporation.

The horizontal-rotor oxidation ditches, equipped with blades, brushes, or cages, have difficulties with stratification at depths greater than seven feet. These difficulties include settling of suspended solides, oxygen depletion, and anaerobic digestion in bottom areas, unless a slanted baffle is mounted downstream from the rotor and athwart the channel to force pumped and aerated liquor toward the bottom. Although the baffle creates mixing at lower depths, the unaerated flow beneath the rotors is nevertheless induced flow, not pumped flow, and is subject to retardation if the friction head is excessive. However, such horizontal-rotor ditches have a usual depth of 3–7 feet and a maximum depth of 12 feet when equipped with a slanted baffle. These oxidation ditches appear to be limited because the rotors must be spaced short distances apart in series around the channel so that they also operate as booster pumps. The rotors are manufactured by Ladeside Equipment Corporation, Passavant Corporation, Walker Process Division of CBI, and others.

Aeration discs that are 4.5 feet in diameter and 0.5 inches thick, made of perforated plastic and mounted on horizontally disposed shafts, rotate at about 60 rpm in oxidation ditches having multiple channels and are spaced short distances apart. These discs are manufactured by Envirex, Inc.

A floating perforated blade type aerator called the "OTA Aerator", is marketed by Cherne Industrial, Inc. It is 30 inches in diameter and 7 feet long. It has a variable speed hydraulic motor and can also be selectively submerged in order to balance oxygen transfer rate with oxygen demand and ditch velocity.

Jet aerators, such as directional-mix jet aerators manufactured by Pentech Division of Houdaille Industries, Inc., Cedar Falls, Iowa, can be used in deep oxidation ditches, such as a depth of 20 feet, and can thereby have comparatively high rates of oxygen transfer while using diffused or subsurface aeration. However, flow above the jet aerators is induced flow, not pumped flow, so that it is unaerated and later blends with the highly aerated liquor which is ejected from the jets. Moreover, backmixing of aerated liquor readily occurs as eddies develop above the jets.

Inflexibility of operation is characteristic of all prior art oxidation ditches because pumping and oxygen transfer are provided by the same device. Their pump/aerators are unable to provide for variable depth operation or flow equalization in the oxidation ditch, i.e., a depth variation greater than one foot. In addition, they are unable to compensate for variations in temperature, inflow quantity, inflow BOD(5) content, inflow ammonia content, and mixed liquor suspended solids while maintaining adequate flow velocity and sufficient channel length in the anoxic zone for complete denitrification to occur within the channel so that a low effluent nitrate concentration is produced and so that rising sludge in the clarifier does not cause solids to overflow from the clarifier.

Of these variables, temperature appears to give the most frequent difficulty. During summertime operations, the microorganisms are very active and rapidly consume the available quantity of dissolved oxygen, but the $C_s$ level is much lower in summer than in winter so that $dC/dt$ is markedly decreased. In consequence, the length of the aerobic zone tends to be quite short if the F/M ratio remains constant. Generally, a need exists for additional aerating capacity during hot weather.

In wintertime, particularly at subfreezing temperatures, pump/aerators of prior art oxidation ditches usually are unable to decrease aerating activity sufficiently while maintaining adequate mixing and propelling activity. Because the flow velocity must always be enough to prevent sedimentation in the channel, large amounts of dissolved oxygen are introduced into the aerobic zone, while the microorganisms are functioning slowly, so that the aerobic zone may extend throughout the endless channel, thereby making denitrification impossible. These effects may be minimized to some extent by increasing the MLSS levels during cold weather, but clarification also becomes less efficient because water becomes more dense as it cools, reaching maximum density at 4° C. (37° F.). The result is that smaller particles are likely to be carried with the effluent from the clarifier, thereby raising its biochemical oxygen demand, when MLSS levels are high during very cold weather.

All prior art oxidation ditches also lack a means to introduce air at a shallow depth to create an air-liquor mixture, and then to pump the air-liquor mixture to a depth greater than the floor or bottom of the channel, whereby energy can be saved because pumping a liquid consumes less energy than compressing a gas, and absorption of oxygen by water becomes greater as pressure increases. Further, all prior art oxidation ditches are unable to mix air with the liquor within the channel at a depth greater than the channel depth.

During intermittent in situ settling of the mixed liquor while using the entire oxidation channel as clarifier, all prior art oxidation ditches except the systems of Hungarian Pat. No. 166,160 and of German Pat. No. 2,300,273 have had no means to destroy the momentum of the mixed liquor, thereby enabling settling to commence quickly, except by reversing the pump/aerator, such as the rotors, as described by M. C. Goronszy in "Intermittent Operation of the Extended Aeration Process for Small Systems", *Journal Water Pollution Control Federation*, Volume 51, No. 2, Feb. 1979, pages 274–287.

The ideal design for both efficient oxygenation and denitrification is an oxidation ditch having a channel of sufficiently large cross section that the desired volume can be obtained within an oxic nitrification length plus an anoxic denitrification length that can be pumped with any desired number of pump/aerators which are disposed at a single location to provide point-source aeration, as contrasted to the multi-source aeration of the prior art for large oxidation ditches, while aerating homogenously, rather than heterogenously.

The parent applications, particularly Ser. Nos. 649,995, and now abandoned, 848,705, and now abandoned, and 28,383, now U.S. Pat. No. 4,278,547, have provided barrier oxidation ditches, utilizing submerged turbine pump/aerators, that satisfy these requirements. Each of these pump/aerators, as described in U.S. Pat. No. 4,260,486, comprises a pump motor operating a vertically mounted propeller shaft and propeller within a downdraft tube having a funnel at its upper end and a connection at its lower end to a J-shaped draft tube or deep oxygen contact duct which is rigidly embedded in the bottom or floor of the channel and which extends to a considerable depth, such as 15–40 feet, therebeneath. An air sparge is disposed immediately beneath the propeller. The discharge of the contact duct is oriented in the downstream direction and is separated from the funnel by a barrier which is sealably attached athwart the channel, so that all of the upstream mixed liquor in the intake channel must pass through the contact duct and none of the aerated downstream liquor in the discharge channel can backmix into the intake channel.

However, these deep duct pump/aerators have flexibility limitations. More specifically, when a pump/aerator motor is chosen by a designer for maximum efficiency at a selected set of conditions, no higher horsepower rating is used than is absolutely necessary. Any greater air sparging requirement than the designed amount is likely to cause the pump/aerator to "flood" (i.e., the impeller churns without pumping) or to require greater horsepower for pumping the liquor-air mixture of higher air content.

Removable contact duct diffusers are also selectively installed to deliver small bubbles of compressed air at approximately the deepest part of the deep contact duct for augmenting the air supply from the sparge, as particularly described in U.S. Pat. No. 4,260,486. When operating, such diffusers function as an air lift pump for the liquor being pumped through the deep duct and thereby accelerate the flow and assist the propeller. In effect, the diffusers and the sparge tend hydraulically to counterbalance each other so that use of the diffusers imparts additional flexibility of flow control as well as additional flexibility and capacity for aeration. On the other hand, use of the diffusers requires a compresser operating at a higher pressure than the compresser used for the sparge. In addition, the air added by the diffusers is in contact with the liquor being pumped for an appreciably shorter time than the air added by the sparge, so that mass transfer of difficultly absorbed oxygen is relatively less effective.

There is nevertheless a need for an additional aeration means which can add finely dispersed compressed air to the total liquor that is circulating in the channel without adding appreciably to the load on the propeller and without serious loss of contact time of bubbles with liquor within the deep contact duct, in order to obtain more aeration efficiency without hampering pumping efficiency. Moreover, there is a need for combining this additional aeration means with a means for preserving the kinetic energy in the flowing mixed liquor, in order to obtain more pumping efficiency. This flowing mixed liquor possesses momentum that could readily enable the liquor to flow past the funnel, were the barrier not present. When allowed to do so, it is termed induced flow. It is further desirable to provide a kinetic-energy preserving means that is capable of passing induced flow liquor through the deep contact duct with the directly pumped flow in order for the induced flow to become aerated by pressurized contact with dispersed air bubbles.

In engineering terms, it may be stated that experience in design and operation of barrier oxidation ditches indicates that maximum air sparge rates of 10.0 to 12.5 scfm/bhp are possible when the entire flow through the deep contact duct is pumped by and through the pump within the downdraft tube. In this 100% pumped flow design, the oxygen transfer rate is limited by the maximum air sparge rate that can be tolerated by the pump, up to the flood point of approximately 13-15 cfm/bhp. Therefore, there is a need to increase significantly the total flow rate through the deep contact duct per brake horsepower, thereby significantly increasing the air sparge rate and consequent oxygen transfer rate per brake horsepower per hour.

SUMMARY OF THE INVENTION

In accordance with the principles of this invention, it is an object to provide a kinetic energy preserving means in a barrier oxidation ditch that passes the induced flow through the deep contact duct.

It is another object to provide an aeration means for the induced flow that is operable at approximately the same pressure as the air sparge.

It is a further object to provide a means for maximizing the total liquor flow rate through the deep contact duct per brake horsepower expended for pumping and compressing air.

It is also an object to maximize the amount of air that can be dispersed into the pumped and induced flow liquors and thereafter brought into pressurized contact with air at a depth substantially greater than the bottom of the channel.

In fulfillment of these objects, a circulator/aerator is provided which comprises a deep oxygen contact duct having an upper end which accepts pumped and induced flows of mixed liquor from the intake channel, a pump means operating within the central portion of the contact duct upper end and in spaced-apart flow connection with the deep contact duct, an aeration means which is disposed within the upper-end of the deep contact duct, an intervening space between the tips of the propeller of the pump means and the surface of the upper end of the deep contact duct, and compressed air delivery means for the aeration means.

The upper end of the contact duct may contain the pump means as an elongated shaft, propeller, and slap ring or as a submersible motor, very short shaft, and relatively high-speed propeller of relatively small diameter. The pump means may comprise a single propeller which is coaxially disposed within the upper end of a contact duct. Alternatively, the pump means may comprise two or more propellers which are disposed in a row within a transverse slot which forms the upper end of a very large contact duct at the downstream end of the discharge channel, whereby the deep oxygen contact duct is the discharge duct for a plurality of pumps.

The upper end of the contact duct may also contain a downdraft tube which is in surrounding relationship to a coaxially disposed propeller of the pump means. It is preferred that the downdraft tube, if used, and the deep contact duct be cylindrical to create an annular intervening space, but it is suitable to combine a round lower end of the downdraft tube with a square upper end of the deep contact duct, for example. The ring or rings comprising the eddy jets or other diffusers, as the contact duct inlet air sparging means, may be round, square, or octagonal, for example, to fit into this intervening space.

The aeration means may be disposed in flow relationship to the pump means and/or in flow relationship to the intervening space, whereby the pumped flow and/or the induced flow are respectively aerated. The aeration means may be in the form of air diffusers and/or eddy jet difusers. Air diffusers may be in a variety of forms, including metal or plastic pipes with holes therein, such as a sparge ring, and nylon cloth or mesh rings containing gravel.

Although any commercially available diffusers are satisfactory, eddy jet diffusers are preferred because they act as pumps for the mixture of ejected air and liquid being aerated and because their efficiency increases as the flow rate of this liquor increases. The eddy jets can be installed in the intervening space in any suitable manner, but it is preferred that they be attached to one or more air-and liquid-supplying rings or headers, for example, which fit into or adapt the jets for discharging into the intervening space.

In addition to the sparge and the eddy jets, a diffuser may be removably inserted into the deep contact duct, as another component of the aeration means. Its location is suitably anywhere from slightly past the deepest part of the contact duct to one half of the discharge length past the deepest part.

The purpose of this invention is to increase the liquor flow rate (measured as cubic feet per second, cfs), the air sparge rate (measured as standard cubic feet per minute, scfm), and the oxygen transfer rate (measured as pounds of oxygen transferred per hour) in the barrier oxidation ditch process by producing both directly pumped flow past the propeller and induced flow through the intervening space surrounding the tips of the propellers and within the wall of the deep oxygen contact duct. Such an intervening space is outside of the downdraft tube if it is utilized. Induced flow is defined as additional flow, occuring through an idle circulator/aerator, through a contact duct larger in diameter than the pumping propeller, or through a selectively opened gateway in a barrier, that is in excess of the flow being pumped directly by an operating pump/aerator. This invention is directed to efficiently aerating the induced flow that is commonly observed to move through an idle circulator/aerator or through a partially barriered channel of an oxidation ditch. Such efficient aeration of the induced flow is achieved by exposing the induced flow to oxygen transfer at increased pressure.

A circulator/aerator is herein defined as comprising a propeller-type pump means, an induced-flow admission means, an aeration means that may be disposed in the flow paths of the pumped liquor and/or the induced liquor, and a deep oxygen contact duct of large capacity. A pump/aerator can be any device that is capable of both aerating and pumping but is herein defined for the purpose of this invention as comprising a propeller-type pump means, an aeration means that is disposed in the flow path of the pumped liquor, and a deep oxygen contact duct.

When the directly pumped flow and/or the induced flow is aerated, a mixture of air and mixed liquor is forced into the deep oxygen contact ducts (also termed U-tubes or discharge ducts) wherein oxygen transfer occurs. This is an energy efficient situation which is termed homogenous aeration because mixing of air and liquor occurs before oxygen transfer takes place. This situation is in contrast to blending unaerated liquor with previously aerated liquor, an energy-inefficient situation which is termed heterogenous aeration.

This invention provides a method and a means for: (1) utilizing the dammed-up momentum in the mixed liquor approaching the barrier and to release an unused portion of the kinetic energy in this mixed liquor by enabling induced flow (a suitable name for this induced flow could be "energy-release flow") to pass through the deep oxygen contact ducts with the directly pumped flow, and (2) obtaining homogenous aeration of both the directly pumped flow and the induced flow by pressurized contact with diffused air after admixture thereof with the flows has occurred. This procedure is believed to be an improvement over allowing the induced flow to pass through a barrier or under a partial barrier because such flow, even if aerated while passing therethrough, cannot be in contact with diffused air under pressure.

In addition to the "energy-release" induced flow, it is believed that additional induced flow into the annular inlet is available because of the suction effects of the following, when in use:
 (1) the air-liquid jet aerator flow,
 (2) the directly pumped flow, and
 (3) the upwardly moving mixture of liquor and diffused air from the removable contact duct diffusers.

The amount of air in cubic feet per minute (cfm) that can be sparged and/or diffused and/or jetted into the deep oxygen contact duct is directly proportional to the total amount of the directly pumped and induced liquor flow rate (cfs) into and through the deep oxygen contact duct. Consequently, the greater the liquor flow rate that can be generated through a deep contact duct of a circulator/aerator per brake horsepower (bhp), the greater the amount of air that can be diffused, jetted, or sparged to pass through the deep contact duct without causing flooding of the pump.

For example, in existing total barrier oxidation ditch systems, the entire circulatory flow passes from the intake channel to the discharge channel through the pump/aerator. Specifically, the flow passes through the discharge duct (deep oxygen contact duct) and is directly pumped by the propeller which is disposed within the downdraft tube. The maximum amount of air that can be sparged into a pump/aerator of a given horsepower without causing flooding is directly determined by the maximum amount of flow that can be generated by its propeller. Experience in design and operation of pump/aerators in barrier oxidation ditches to date indicates that maximum air sparge rates of 10.0 to 12.5 scfm/bhp are possible when the entire flow rate is pumped through a downdraft tube into the sealably attached deep oxygen contact duct. In this 100% pumped flow design, as disclosed in U.S Pat. No. 4,260,486, the oxygen transfer rate is also limited by the maximum air sparge rate which is the flood point of the pump/aerator (approximately 13-15 cfm/bhp). By using the instant invention, in contrast, the maximum flow rate of liquor through the deep oxygen contact duct can be significantly increased per bhp, thereby significantly increasing the total amount of air that can be admitted to the circulator/aerator without causing flooding thereof and consequently also increasing the oxygen transfer rate per bhp.

The invention comprises a circulator/aerator in a barrier oxidation ditch which has an endless channel, containing translationally circulating mixed liquor, and a barrier which is sealably disposed across the channel to create an intake channel and a discharge channel. This circulator/aerator more specifically comprises:
 A. a deep oxygen contact duct which has an upper end in flow connection with the intake channel and is disposed to pass beneath the barrier at a selected maximum depth;
 B. a pump which comprises:
  (1) a downdraft propeller which is rotatably disposed within the upper end of the contact duct, and
  (2) a central direct pump suction inlet which is coaxially aligned with the propeller;
 C. an induced-flow means which comprises an annular inlet which is disposed around the central inlet;
 D. an inlet aeration means which comprises at least one of the following:
  (1) a central sparge means which is disposed in the flow path of the propeller, and
  (2) an annular diffuser means which is disposed in the flow path through the annular inlet; and
 E. an air compressing means and an air supply means which are in flow connection and are connected to the inlet aeration means.

A duct aeration means may also be removably disposed in line with the deep oxygen contact duct so that a plurality of air diffusers or eddy jets are at the bottom of the duct but beyond the deepest part of the duct with respect to the direction of flow. The duct aeration means is usually also connected to the air supply means and to an air compressing means operating at a higher pressure than the pressure needed for the central sparge means and annular diffuser means.

The annular diffuser means may be any type of coarse or fine bubble diffuser but is preferably an eddy jet diffuser system which comprises:

(1) at least one air/liquor header which is disposed within the annular inlet,
(2) a plurality of eddy jet aerators which are flow connected to the header or headers and are disposed to discharge downwardly, and
(3) a liquor pump which is flow connected to the air/liquor header or headers.

To place the instant invention in perspective, a comparison with the best prior art in present commercial use is helpful. The total barrier oxidation ditch system, as described in U.S. Pat. No. 4,260,486, has a pump/aerator within a draft tube which is flow connected to its discharge duct (deep oxygen contact duct). Assuming a typical pump has a 101.5-inch diameter propeller driven by a 125-hp motor, pumping requires 113 bhp for moving approximately 400 cfs through the 9-foot diameter deep contact duct having a centerline depth of exactly 25 feet at its deepest point. Supplying air for its sparge means, disposed beneath the propeller, with a 40-hp motor requires 37-bhp for sparging 1180 scfm of air at 5.25 psig. Assuming 50% oxygen transfer efficiency, 610 pounds of oxygen are transferred per hour at 20° C. and at sea level by a total of 154 bhp to produce an oxygen transfer efficiency of 3.96 pounds $O_2$/hr/bhp at standard conditions.

In comparison, a comparable induced-flow system of this invention, having an intervening space equipped with a single header of 22 jets, produces 185 cfs of mixed liquor as the flow rate of upstream liquor through a 6-foot diameter draft tube. The flow rate through the intervening space (typically, the annular inlet) while a single or double ring of eddy jets is in operation is 221 cfs, utilizing only induced flow in the intake channel, so that the total flow rate of liquor through the deep contact duct having a centerline depth of 25 feet is 406 cfs. The six-foot diameter propeller is driven by a 50-hp motor which draws 46 bhp. The blower, which produces a total of 1180 scfm for the jets and the sparge at 5.00 psig, requires 32 bhp. The submersible pump draws 14 bhp. The total brake horsepower requirements are 92 bhp. Assuming 50% oxygen transfer efficiency, 610 pounds of oxygen are transferred (without allowing for the smaller size of the jet bubbles). The oxygen transfer efficiency is 6.63 pounds $O_2$/hr/bhp at standard conditions.

Using the same 72-inch diameter propeller, the 50-hp motor draws 46 bhp. The two jet headers, having a total of 44 jets, are supplied by a 60-hp blower (with a service factor of 1.15 instead of 1.00) which draws 61 bhp to produce a total of 2210 scfm at 5.00 psig. The submersible pump requires 21 bhp. The total horsepower requirements are 128 bhp. Making the same assumptions, 1,144 pounds of $O_2$/hr are transferred to the mixed liquor. The oxygen transfer efficiency is 8.94 pounds $O_2$/hr/bhp.

The induced-flow, deep contact duct apparatus of the invention, therefore, provides oxygen transfer efficiencies that are 1.6 to 2.2 times as great per bhp as that attainable by the 100% pumped flow of the total barrier oxidation ditch.

BRIEF DESCRIPTION OF THE DRAWINGS

The invention may be more fully understood by a study of the accompanying drawings in which FIGS. 4-6 and 8-19 relate to the invention and FIGS. 1-3, 7, and 20-22 relate to the prior art.

DESCRIPTION OF THE PREFERRED EMBODIMENTS

This invention is directed to utilizing the dammed-up momentum in the upstream mixed liquor within the intake channel of a barrier oxidation ditch and to obtaining homogenous aeration by mixing both the directly pumped flow and the induced flow with diffused air to create a liquor-air mixture before the combined flows and diffused air reach the deepest portion of the discharge duct. FIGS. 2-6 are pertinent to this homogenous aeration concept.

Figure 2:
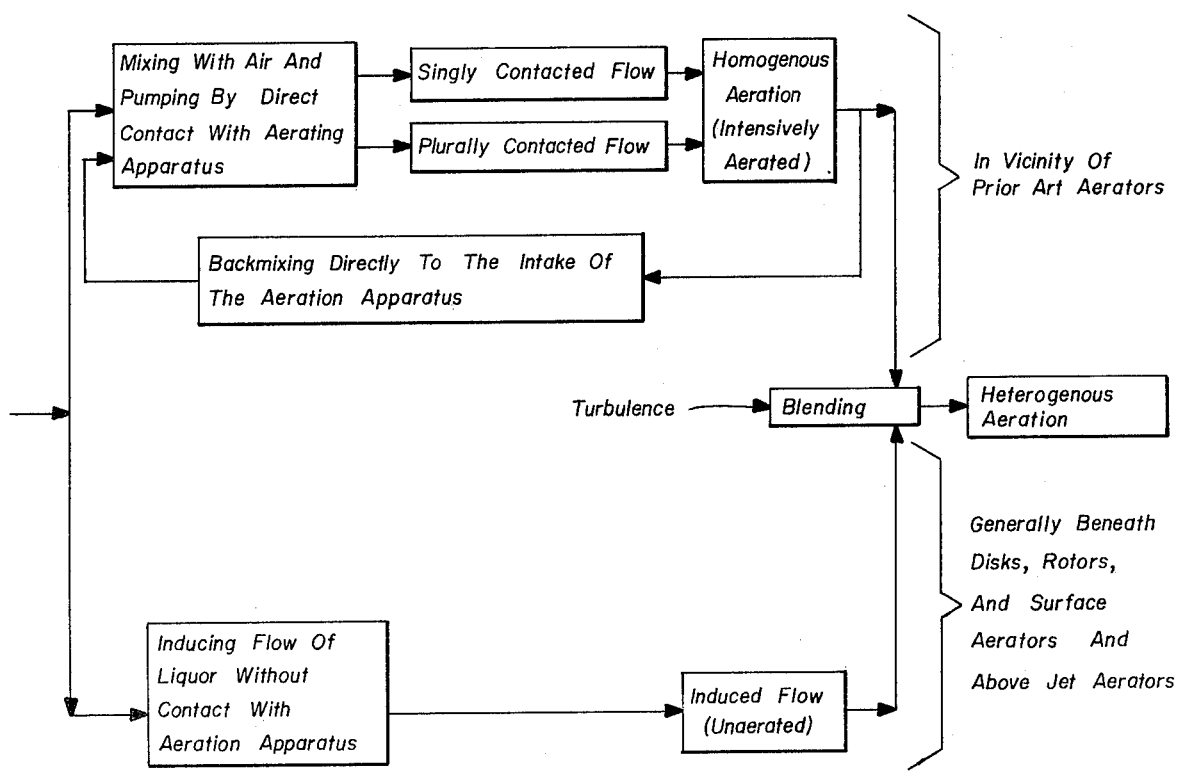
FIG. 2 is a schematic flow chart showing the movements of aerated and unaerated liquors, in the vicinities of prior art aerators of plug flow and complete mix basins and of aerators of oxidation ditches, that result in backmixing and heterogenous aeration.
Figure 3:
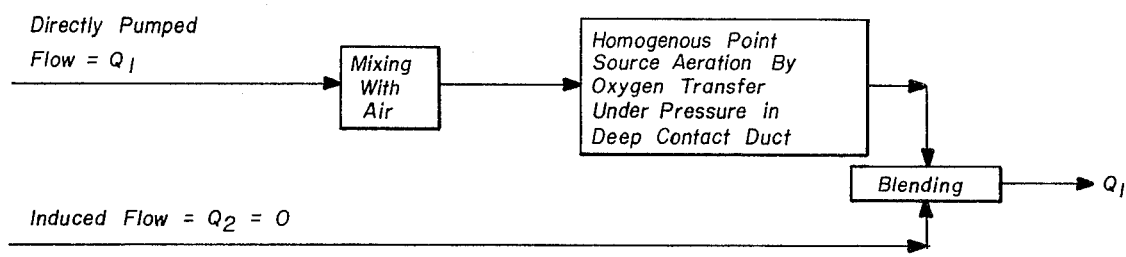
FIG. 3 is a schematic flow chart, similar to FIG. 2, showing the movement and aeration of mixed liquor in a total barrier oxidation ditch, as described in U.S. Pat. No. 4,260,486.

FIG. 2 relates to prior art wastewater treatment before the invention of the barrier oxidation ditch, as taught in U.S. Pat. No. 4,260,486. FIG. 3 relates to prior art wastewater treatment in such a barrier oxidation ditch. Homogenous aeration is automatically obtained because all of the liquor is aerated; in addition, backmixing can never occur. Moreover, this total barrier oxidation ditch system achieved what the wastewater treatment industry had sought for more than 20 years: a "four-pound aerator", meaning at least 4.0 pounds $O_2$/bhp/hr as the oxygen transfer efficiency.

However, the momentum of the mixed liquor in the intake channel, as it approaches the barrier with each circuit flow thereof, is at least partly lost, as discussed in U.S. Pat. No. 4,278,547 which furnishes methods and means for recovering at least a portion of the kinetic energy in the translationally flowing liquor and for providing admixture of liquor with air to obtain homogenous aeration while obviating backmixing. However, the liquor-air mixture cannot be pressurized at a hydraulic pressure greater than the pressure at the bottom of the channel. Being able to do so would greatly increase the amount of oxygen transferred to the mixed liquor and the oxygen transfer efficiency of the system.

Figure 4:
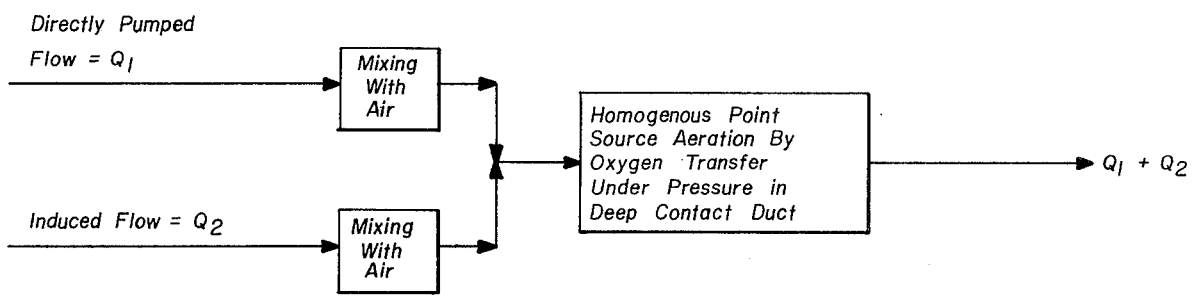
FIG. 4 is a schematic flow chart showing the movement and aeration of liquor in the induced-flow barrier oxidation ditch of this invention when both the directly pumped flow and the induced flow are mixed with air.
Figure 5:
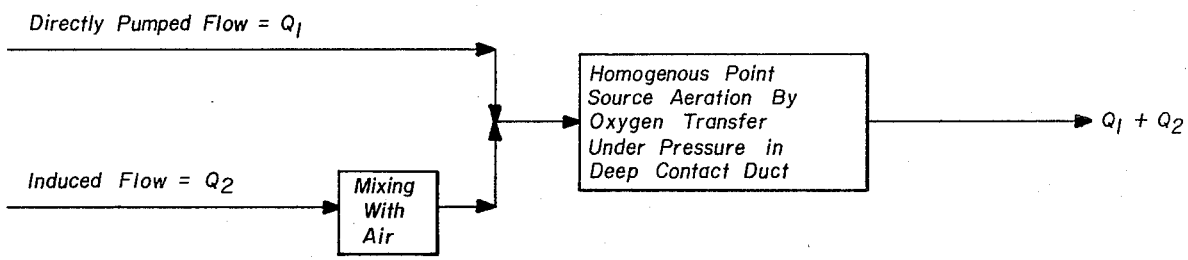
FIG. 5 is a schematic flow chart, similar to FIG. 4, in which only the induced flow is mixed with air.
Figure 6:
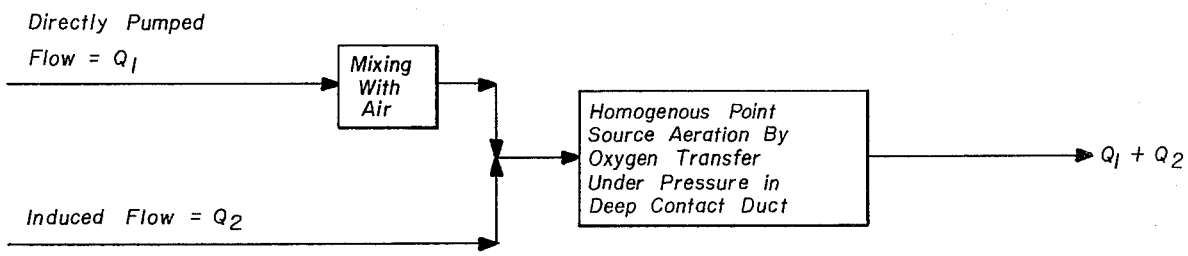
FIG. 6 is a schematic flow chart, similar to FIGS. 4 and 5, in which only the directly pumped flow is mixed with air.
Figure 6A:
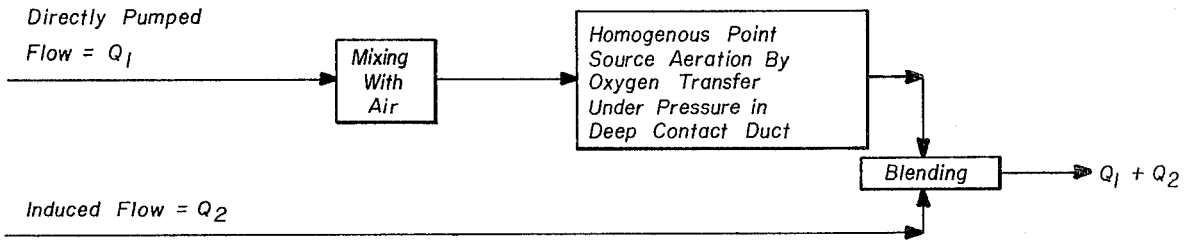
FIG. 6A is a schematic flow chart, similar to FIG. 3, in which the directly pumped flow is mixed with air and then blended with unaerated induced flow, as would pass through gateways 182, 183 in FIGS. 32-34 of U.S. Pat. No. 4,278,547, thereby illustrating heterogeneous aeration.

FIGS. 4-6 provide schematic illustrations of the method of this invention for obtaining such greatly increased oxygen transfer efficiency. These figures show that whether the directly pumped flow, the induced flow, or both are admixed with air, homogenous aeration occurs as the combined flows and air undergo oxygen transfer under pressure within the deep contact duct.

Figure 7:
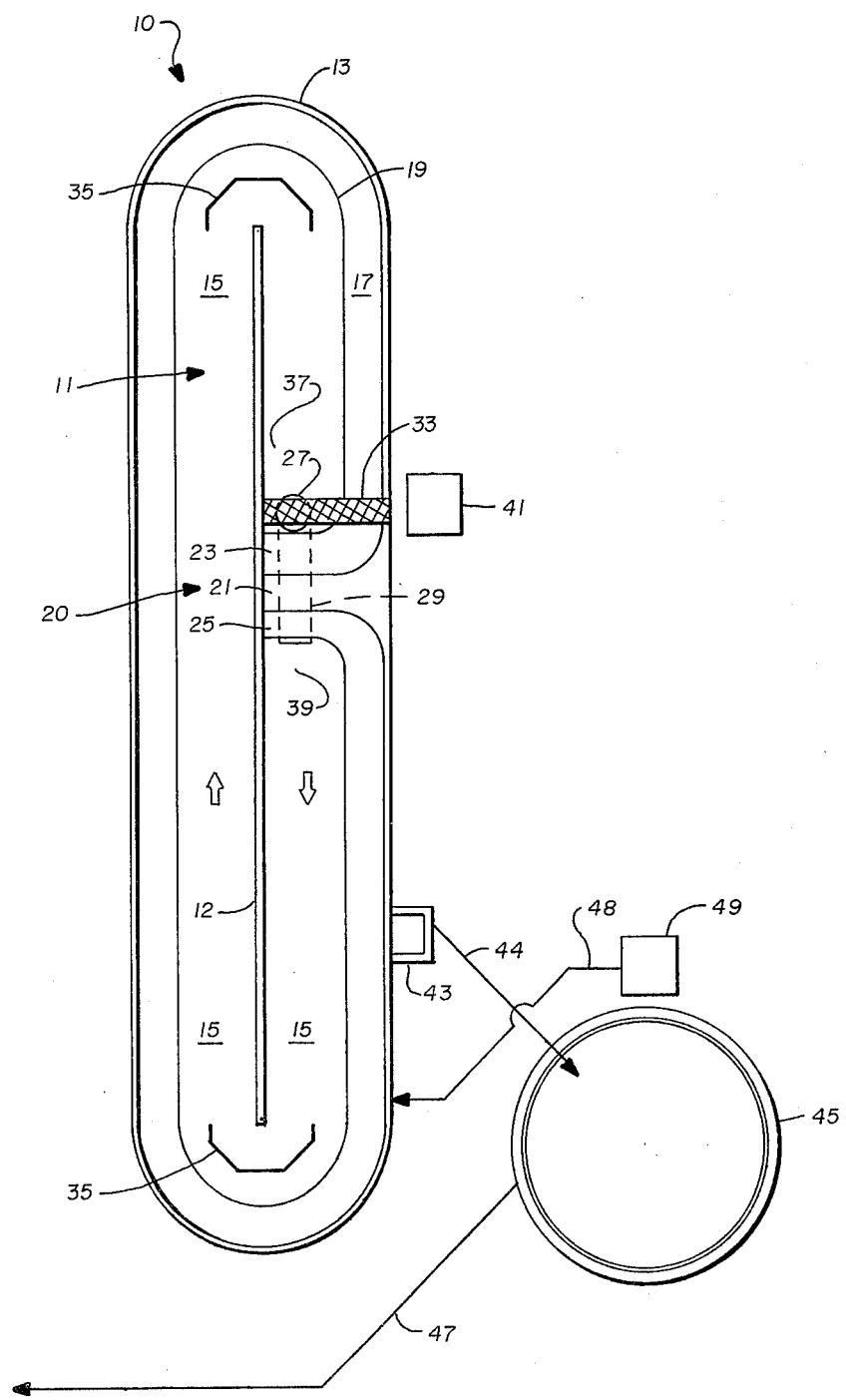
FIG. 7 is a plan view of a barrier oxidation ditch, having a planar partition means which is centrally and longitudinally disposed to define an endless channel within the racetrack-shaped outer walls, a barrier athwart the channel, a pump/aerator passing beneath the barrier, a flow-control unit, a circular clarifier which receives mixed liquor from the flow control unit, a sludge return pump station, and an air supply blower building.

The total barrier oxidation ditch 10, as seen in FIG. 7 in plan view and as generally described in U.S. Pat. No. 4,260,486, comprises an endless channel 11 formed by a centrally disposed partition 12 within an outside wall 13, a floor or bottom 15, a sloping outside wall which meets bottom 15 along line 19, a barrier 20, a pump/aerator 27, and a pair of turning baffles 35. Barrier 20 has a top 21, a sloping upstream side 23, and a sloping downstream side 25. Pump/aerator 27 is positioned beneath a walkway 33 and is connected to a deep oxygen contact discharge duct 29 which passes beneath barrier 20 and connects intake channel 37 to discharge channel 39.

An air supply blower building 41 is disposed alongside wall 13 of ditch 10 and close to walkwa6 33. A flow control unit 43 is also located near outside wall 13 but downstream of discharge channel 39. A clarifier 45 is additionally located nearby. It receives mixed liquor from unit 43 through line 44 and sends clarified liquor to disposal through line 47. Settled sludge is received by sludge return pump station 49 and returned to channel 11 through line 48.

Barrier oxidation ditch 10 has a single pump/aerator 27 which circulates the mixed liquor through endless channel 11 while aerating it with aerating devices that are not visible in FIG. 7. However, two or three pump/aerators may be placed in side-by-side relation, as seen in U.S. Pat. No. 4,260,486, which is wholly incorporated herein by reference.

This invention principally relates to certain additional components of pump/aerator 27 which are required for enabling mixed liquor to move as induced flow, in addition to the pumped flow, and for introducing additional air to the mixed liquor moving through deep contact duct 29 in order that the unaerated upstream liquor in intake channel 37 will be transformed into aerated downstream liquor in discharge channel 39 with minimum loss of the kinetic energy in the upstream liquor.

Circulator/aerator 50 of FIGS. 8-11 is one exemplary device which is useful as pump/aerator 27 and duct 29 of FIG. 7 and is highly preferred because of its versatility, adaptability, and ability to conserve kinetic energy. Circulator/aerator 50 comprises a pump 60, a sparge device 70, an eddy jet assembly 80, a removable eddy jet liquid supply pump assembly 100, a deep contact duct 110, a removable air diffuser assembly 120, and a barrier device 130.

In this detailed view of circulator/aerator 50, bottom 58 corresponds to bottom 15 in FIG. 7. A transverse walkway 52, corresponding to walkway 33, is upheld by support members 51, which are attached to the outer wall of the channel and to partition 57, and has railings 53. A longitudinal walkway 55 is attached to transverse walkway 52 and extends therefrom to barrier device 130; it is similarly supported by members 51 and has railings 56.

Pump 60 comprises an electrical motor 61, a speed reducer 62, a shaft 63, a propeller 64 which includes blades attached to a hub which is attached to shaft 63, a funnel 65, and a downdraft tube 66 which is connected to funnel 65 and within which propeller 64 rotates. Pump 60 is a draft tube aerator pump as conventionally used in wastewater treatment systems of the complete mix type. Tube 66 has diameter 68.

Figure 10:
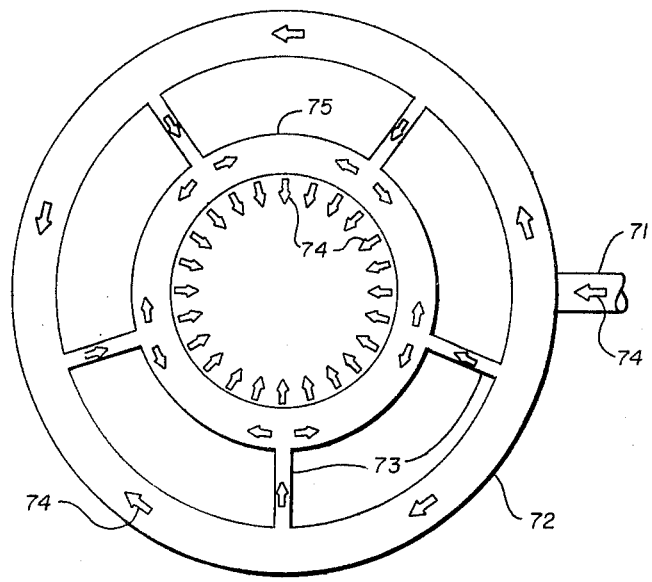
FIG. 10 is a plan view of the air sparge of FIGS. 8 and 9, including an internal sparge ring and a peripheral distribution duct.
Figure 11:
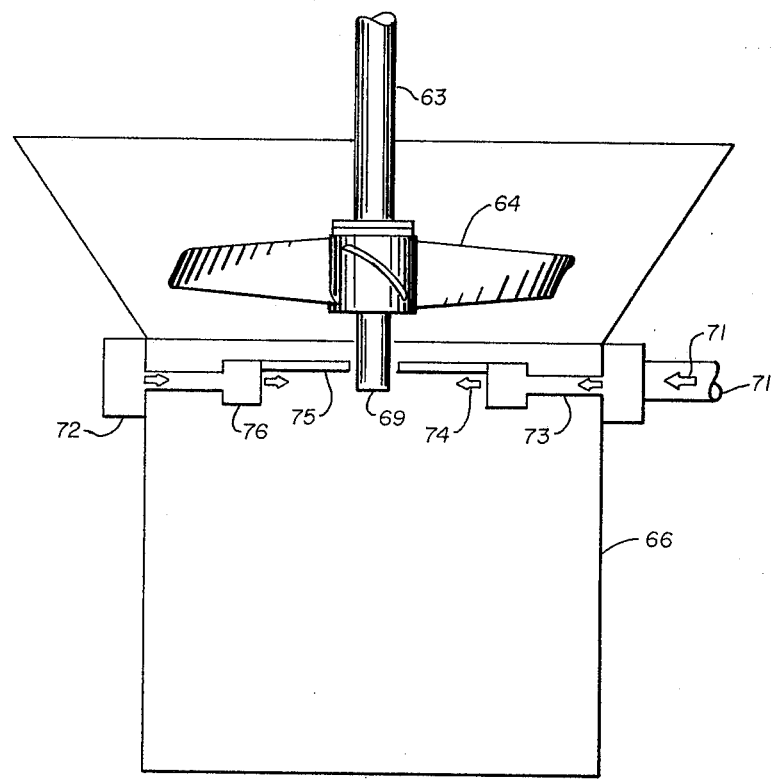
FIG. 11 is a detailed sectional elevational view of a portion of the downdraft tube and propeller of FIGS. 8 and 9, as a section taken through the center of its sparge ring.

Sparge device 70 comprises a vertically disposed air delivery line 71 which is flow connected to a compressor, such as in blower building 41 of FIG. 7, a circumferential air distribution duct 72 which is flow connected to line 71, a plurality of sparge distributors or fingers 73 which are flow connected to duct 72, and a sparge ring 75 which is disposed inwardly about fourth of the draft tube diameter 68 and has a diameter which is about one half of the draft tube diameter. A nonlubricated guide bearing or slap ring 76 may be attached to ring 75 for guiding stub shaft 69, but bearing 76 is omitted for clarity in FIG. 10. Air flow is indicated in FIGS. 10 and 11 by arrows 74. A plurality of vertically disposed anti-vortex baffles 79 are also attached to funnel 65.

Eddy-jet assembly 80 comprises a conical wall 82, a vertically disposed compressed air delivery line 83, an upper jet header 84, a lower jet header 85, a plurality of upper eddy jets 86 which are attached to upper header 84, and a plurality of lower eddy jets 87 which are attached to lower header 85. Headers 84, 85 comprise separate ducts for pipes containing compressed air and liquor under pressure which are separately connected to jets 86, 87. Arrows 88, 89 indicate the flow directions of air/liquor mixtures emitted or ejected by upper and lower jets 86, 87, respectively. The jetted air/liquor mixture flows 88, 89 discharge into the annular space between the lower portion of downdraft tube 66 and wall 82. Tube 66 extends into duct 110 to form an annular space for induced flow of mixed liquor to flow into duct 110 under pressure of the momentum existing within the intake channel, such as intake channel 37 in FIG. 7. Flow 77 enters this annular space, and flow 78 enters the central zone above funnel 65.

The removable eddy jet liquid supply pump assembly 100 comprises a submersible electric motor 101, a centrifugal pump 102, a vertically disposed liquor discharge pipe 103, control valve 104 and handle 105, a supply line 106 to the removable duct diffusers, a control valve 107 and handle 108, and a vertically disposed liquor delivery line 109 which is connected to the liquor pipes of both headers 84, 85.

Deep oxygen contact duct 110 comprises an initial duct segment 111 which is vertically disposed and in flow connection with conical wall 82, a plurality of segments 113, and a discharge segment 115 having a discharge end 116. Each segment 111, 113, 115 has a diameter 114 which is considerably larger than diameter 68 of tube 66. For example, if tube diameter 68 is six feet, duct diameter 114 is suitably nine feet so that the annular space between tube 66 and duct 110 is no less than 1.5 feet, offering a cross-sectional area of no less than 35 square feet. The mid-center maximum depth 117 below water level 59, as indicated by arrow 119, is suitably about 25 feet, for example.

Removable air diffuser assembly 120 comprises a fixed outer slot 121 having a bottom end within a shallow trough 122 extending transversely across segment 115, a removable air supply pipe 123, a liquor supply pipe 124 which is connected to pipe 106, and a plurality of eddy jet diffusers 125 which are attached to pipes 123, 124 near their lower ends and extend transversely through trough 122.

Barrier device 130 comprises slab-like barrier 131 having a top 132, an upstream berm having an inclined upper surface 135, and a downstream berm having an inclined upper surface 137. Barrier 131 may additionally be provided with an adjustable gateway, either pivotable or vertically slideable, which may be disposed below the intersections of surfaces 135, 137 with barrier 131 and within a longitudinally disposed slot cut into berms 135, 137. Auxilliary eddy jet air duffusers may be disposed at the bottom of the gateway. Slot 121 is suitably rigidly attached to and supported by the downstream side of barrier 131. However, air diffuser assembly 120 and barrier device 130 need not be attached or even be in the same area because their functions are entirely independent.

Figure 1:
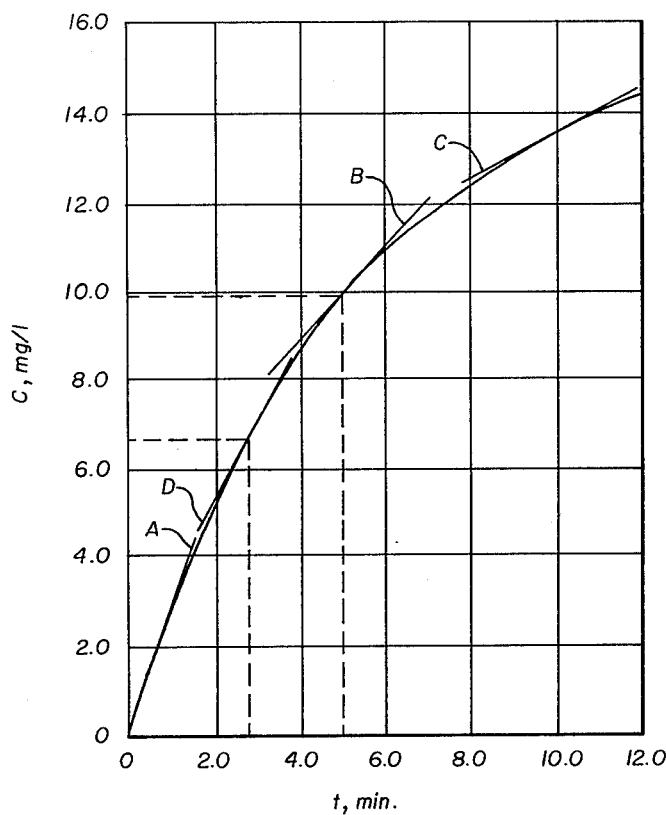
FIG. 1 is a graph showing cumulative concentration of dissolved oxygen in initially deaerated water as a function of cumulative aerating time for a low-speed mechanical surface aerator in a tank, as conventionally obtained while testing prior art aerators.

The invention may be more fully understood by study of the following examples, of which Examples 1 and 2 relate to a total barrier oxidation ditch, very similar to that shown in FIGS. 1 and 2 of U.S. Pat. No. 4,260,486, and Examples 3-5 relate to the instant invention, utilizing the embodiment seen in FIGS. 8-11 hereinbefore.

EXAMPLE 1

Figure 20:
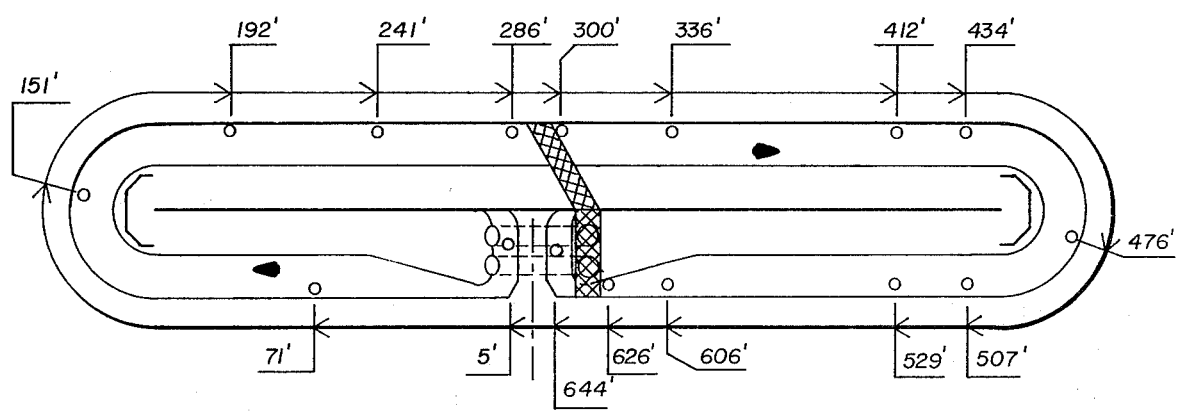
FIG. 20 is a schematic plan view of a total barrier oxidation ditch, having two draft tubes, which is located in Moorefield, W. Va.

In an oxidation ditch as seen in plan view in FIG. 20, studies of hydraulic heads existing along the outer edge while the pumps, sparges, and diffusers were in operation, were made on June 30 and July 1, 1981. Ditch 200 is shown as having an endless channel 201 having a centerline 202, a barrier 203, walkways 204, an inner pump/aerator 205, an outer pump/aerator 206, and discharge ends 207, 208 of the deep contact ducts for pump/aerators 205, 206. A rectangularly shaped clarifier is alongside the discharge channel, which is narrower than the remainder of endless channel 201.

Stations 209, indicated by small circles at which level readings were taken, are alongside the outer wall of the ditch in all but three instances. Each station 209 is marked by a transverse line, next to which is the approximate distance downstream from the center of barrier 203, measured on centerline 182.

The level readings were taken by:
(a) forcing a large nail through the center of a hallowcore, varnished wooden door, measuring approximately 2-5 feet by 7 feet, which had been selected in order to dampen surface turbulence in channel 201;
(b) impaling the lower end of a wooden surveyor's leveling rod upon the nail;
(c) setting up an engineer's level alongside ditch 200;
(d) holding the door and rod at a station 209, generally employing a light rope to overcome the force of the current, while an assistant, acting as rodman, balanced the rod upon the door; and
(e) taking and recording a reading through the level to the nearest one hundredth of a foot.

In numerous instances, particularly at stations 209 which were 5 feet and 644 feet downstream of the center of barrier 203, additional readings were taken by one or both assistants. Averaged readings are given in the following table for four tests.

Test No. 1 employed both pumps 205, 206 at low speed with low-pressure air being admitted to their sparges beneath their propellers. Test No. 2 employed both pumps 205, 206, with no air being admitted to their sparges or to the diffusers in the ducts. Test No. 3 employed pump 205 alone, with low-pressure air being admitted to its sparge while pump 206 idled. Test No. 4 employed pump 205 only, with high-pressure air being admitted to its diffusers which are disposed close to the bottom of its deep contact or discharge duct, while pump 206 idled. The data in Table I are plotted in FIG. 20 with the centerline of barrier 203 being represented by the two side edges of the figure.

Figure 21:
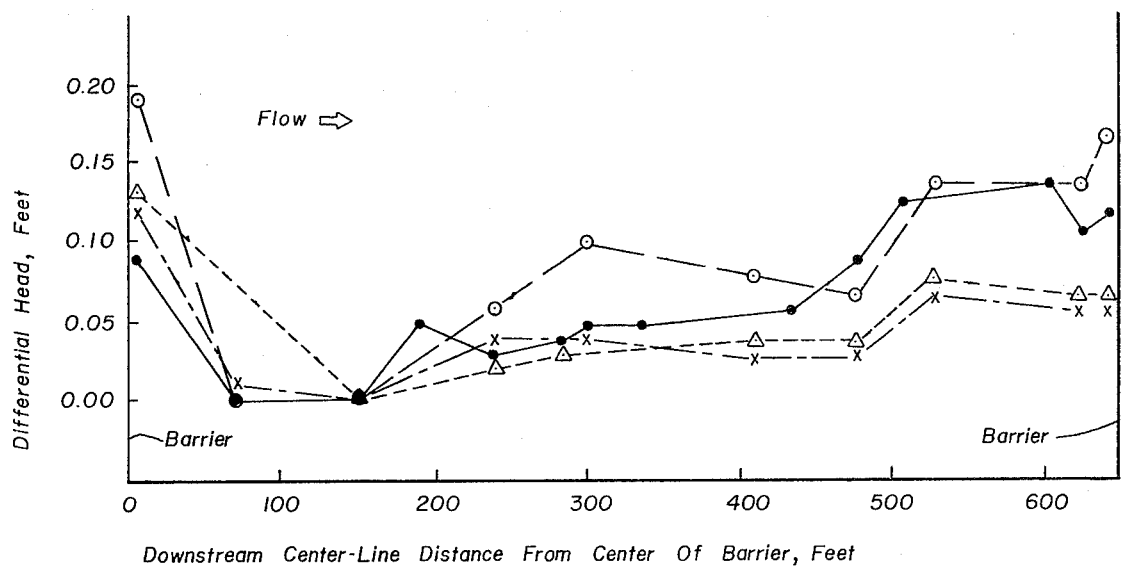
FIG. 21 is a graph of differential hydraulic heads, as the elevations of mixed liquor above the lowest hydraulic heads measured at locations indicated by circles in FIG. 20, under four operating conditions.

The four tests plotted in FIG. 21 indicate that there was a steadily increasing pile-up of liquor in endless channel 181 through nearly 500 feet preceeding barrier 203, thereby indicating that the barrier indeed functioned as a dam, contrary to the belief expressed in column 11, lines 23–27 of U.S. Pat. No. 4,260,486.

Because a civil engineer would have expected a barriered circulator/aerator to function as a dam to some extent and thereby to waste some pumping energy when sealably installed athwart the channel of a prior art oxidation ditch, it is believed that he would never have designed an oxidation ditch having such a barriered circulator/aerator with increased pumping costs unless he were aware of the greater cost of heterogenous aeration and back-mixing, as illustrated in FIG. 2 and as discussed in U.S. Pat. No. 4,278,547 from line 33 of column 6 through line 16 of column 9.

Such a pile-up of liquor against barrier 203 in FIG. 20 should exert pressure against it and cause flow to be created or induced past the barrier if any opening should be made therethrough, such as the slidable gateways in FIG. 32 or the pivotable gateway in FIG. 50 of U.S. Pat. No. 4,278,547. Such induced flow would also be expected to move through a deep oxygen contact duct of an idle circulator/aerator if another circulator/aerator were in operation.

EXAMPLE 2

Immediately following the tests summarized in Table I and under conditions reproducing Test No. 1, the idling speed of outer pump 206 was measured with a stopwatch while inner pump 205 operated with low-pressure air being admitted to its sparge. The idling speed was found to be about 12 rpm in the forward direction, thereby providing an indication of the amount of induced flow that was leaving discharge end 208. Five measurements of the flow velocity within the intake channel were made over a 55-foot distance. The average velocity was 1.47 feet±0.23 feet per second, within 95% confidence limits. Then both pumps 205, 206 were shut down. After the mixed liquor had become quiescent, settling data were taken, and the depth at the station 209 alongside walkway 204 and pump aerator 206 was measured to be 128 inches of quiescent mixed liquor, containing 1,060 mg/l of suspended solids. Then inside pump 205 was started again and its low-pressure blower was also started five seconds later while idling measurements were again taken on outer pump 206, reproducing Test No. 3 after steady-state conditions had been reached. The outer pump 206 briefly reversed quite rapidly, stopped, and then began to rotate again in the forward direction. Stopwatch measurements were made.

Figure 22:
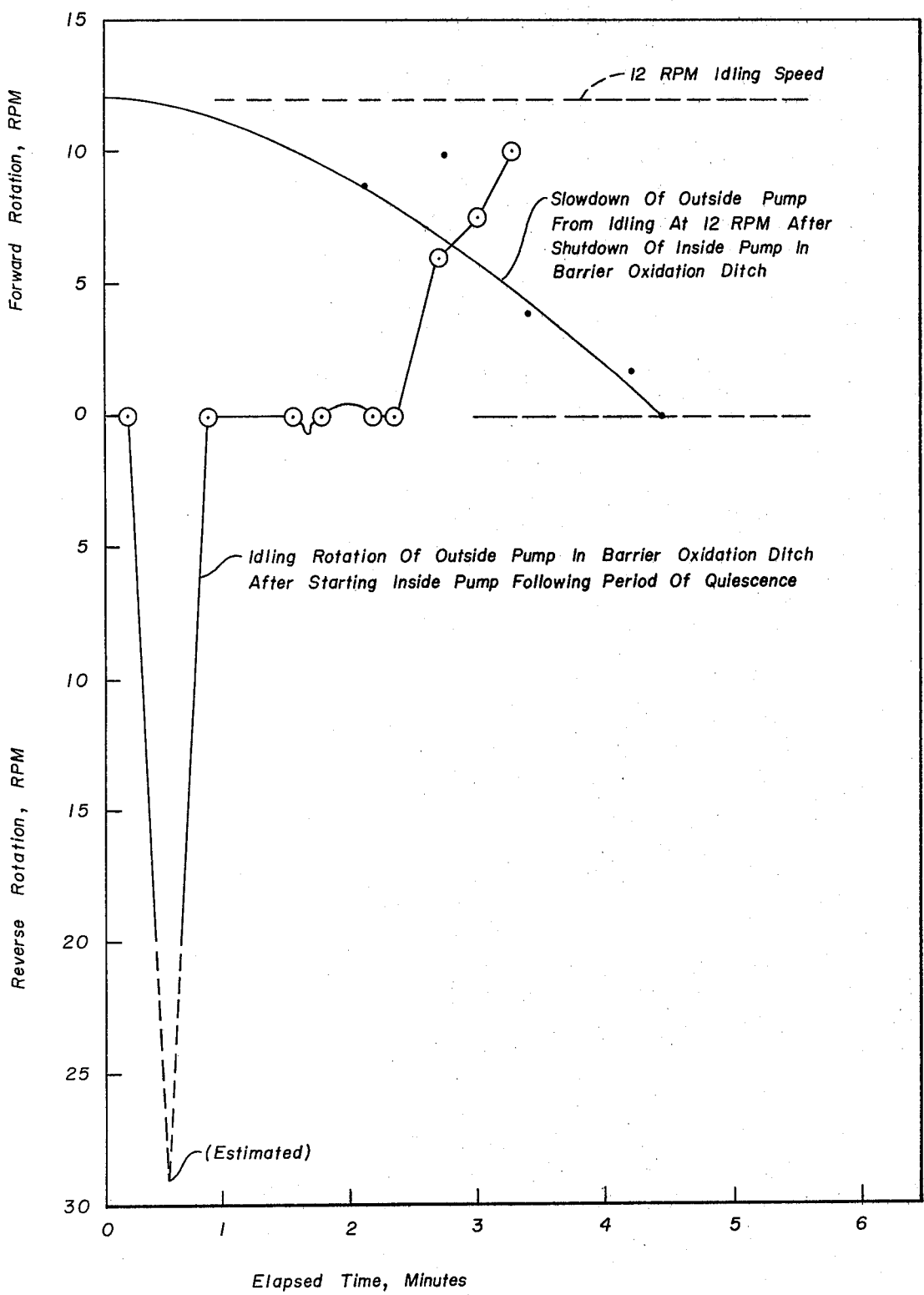
FIG. 22 is a graph showing: (1) idling speed of one pump in the total barrier oxidation ditch of FIG. 20 while the other pump/aerator was in operation with compressed air being admitted to the sparge beneath its propeller, (2) idling speed of this pump after the shutdown of the other pump/aerator, and (3) idling speed of the same pump after resumption of operation of the other pump and its aerator.

Both sets of idling measurements, i.e., before and after shutdown of inner pump 205 and after startup of pump 205 following a quiescent period, are plotted in FIG. 22. These idling measurements appear to indicate that there was considerable kinetic energy in the moving mass of mixed liquor, thereby again demonstrating that the barrier was functioning as a dam.

EXAMPLE 3

A barrier oxidation ditch is designed according to FIGS. 1 and 2 of U.S. Pat. No. 4,260,486, with 100% of the flow passing through a single draft tube pump/aerator and a deep oxygen contact duct (discharge duct) in flow connection therewith. The 125-horsepower pump/aerator is equipped with a 101.5 inch propeller and downdraft tube having 56.12 square feet of draft tube cross-sectional area.

The single deep oxygen contact duct has a diameter of 9 feet, 0 inch (63.58 square feet of cross-sectional area). The centerline depth at the deepest point is 25 feet, 0 inch. The flow rate through the draft tube is approximately 400 cfs at 113 bhp power draw.

A single centrifugal compressor (alternatively, a positive displacement blower is satisfactory) is able to supply 1180 scfm of air at 6.25 psig. At site conditions, it draws 41 bhp.

The estimated standard condition oxygen transfer rate (SOR) is 610 pounds of oxygen per hour, assuming a 50% oxygen transfer efficiency is attained at the 25-foot depth.

The oxygen transfer efficiency is:

$$\frac{610 \text{ pounds O}_2/\text{hr}}{113 \text{ bhp} + 41 \text{ bhp}} = 3.96 \text{ pounds of oxygen per hour per bhp.}$$

The expected flood point equals 1400 scfm of air for this pump/aerator, as compared to the total air flow rate of 1180 scfm that is sparged into the draft tube.

EXAMPLE 4

Figure 13:
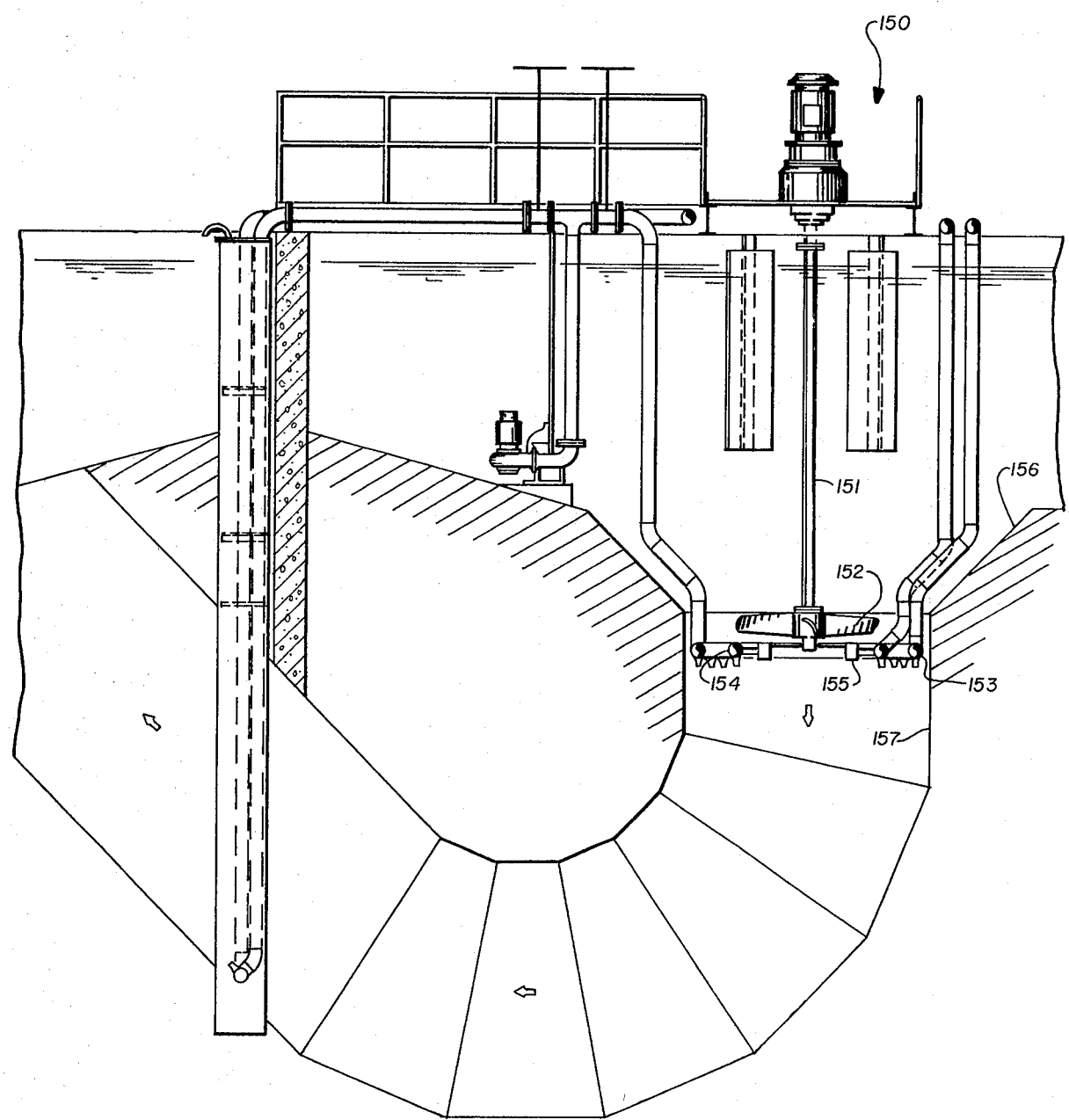
FIG. 13 is a sectional elevational view of a circulator/aerator which is like the apparatus of FIG. 8 except that it has a single air/liquor header with eddy jet diffusers attached thereto and does not have a draft tube.
Figure 15:
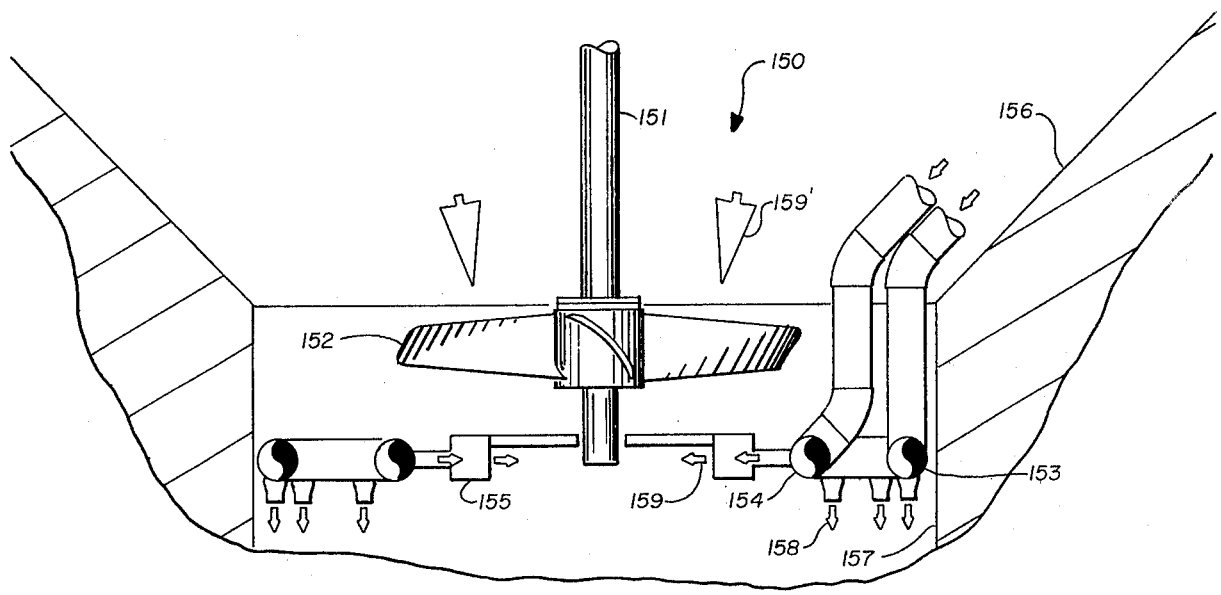
FIG. 15 is a detailed sectional elevational view of the propeller, slap ring, sparge ring, circumferential air distribution duct, and single air/liquor header of FIG. 13.

An induced-flow draft tube circulator/aerator is installed in a barrier oxidation ditch, as shown in FIGS. 7, 13, and 15, but with a single circulator/aerator. The draft tube and propeller are 72 inches in diameter (28.26 square feet of cross-sectional area in the draft tube). The motor is 50 horsepower.

The maximum air sparge rate is 450 scfm at 46 bhp, and the flow rate of mixed liquor through the draft tube is approximately 185 cfs. A single circular header is equipped with 22 eddy jets which are spaced 18 inches apart on center and is mounted as shown in FIGS. 13 and 15. The header is connected to an air supply line and to a liquor supply line which is connected to one submersible sewage pump rated at 14 bhp. Each eddy jet is rated at 33.2 scfm, so that the total eddy jet ring air flow rate is 730 scfm. Adding 450 scfm to 730 scfm equals 1180 scfm for the total air flow rate. A single centrifugal compressor is connected to the air supply lines to supply the 1180 scfm at 5.00 psig, drawing 32 bhp at site conditions.

The deep oxygen contact duct which is connected to the annular inlet is 9 feet 0 inch in diameter (63.58 feet of cross-sectional area) and has a centerline depth at its deepest depth of 25 feet, 0 inch.

The induced flow created by momentum plus the eddy jet liquor/air discharge and by the draft tube pump/aerator discharge is approximately (63.58 ft²−28.26 ft²)×6.25 fps, equalling 221 cfs.

The total flow through the deep oxygen contact duct equals 221 cfs of induced flow and 185 cfs of pumped flow through the downdraft tube, totalling 406 cfs.

The estimated oxygen transfer rate at standard conditions (SOR) equals 610 pounds of oxygen per hour, assuming that a 50% oxygen transfer efficiency is attained at the 25-foot depth in the duct but not allowing for the smaller jet bubbles.

The standard oxygen transfer efficiency therefore equals $$\frac{610 \text{ pounds of oxygen/hour}}{14 \text{ bhp} + 32 \text{ bhp} + 46 \text{ bhp}} =$$

$$\frac{610 \text{ lbs O}_2/\text{hr}}{92 \text{ bhp}} = 6.63 \text{ lbs O}_2/\text{hr/bhp}.$$

The expected aerator flood point with respect to air flow rate through the sparge within the downdraft tube is 540 scfm, as compared to the total air flow rate of 1180 scfm sparged and jetted into the deep oxygen contact duct.

EXAMPLE 5

A draft tube circulator/aerator, having an annular inlet with the same 50-hp motor, 72-inch diameter downdraft tube and propeller, and 108-inch diameter deep oxygen contact duct as in Example 3, is equipped with two circular headers or rings, each having 22 eddy jets on 18-inch centers (a total of 44 jets), as seen in FIGS. 8–11, and is installed as the sole circulator/aerator in a barrier oxidation ditch having the configuration shown in FIG. 7. The headers are connected to an air supply line and to a liquor supply line which is connected to one submersible sewage pump rated at 21 bhp. Each eddy jet is rated at 40 scfm, so that the total air flow rate through the eddy jets is 1760 scfm. Adding this air flow rate to the flow through the sparge within the downdraft tube gives 2210 scfm. This quantity of compressed air is supplied by a centrifugal compressor (60-hp with a 1.15 service factor) which delivers 2210 scfm at 5.00 psig at site conditions and draws 61 bhp.

The induced flow through the annular inlet and through the central inlet (downdraft tube) is (63.58 ft²−28.26 ft²) ×6.25 fps=221 cfs. The total liquor flow through the deep contact duct is 221 cfs of induced flow plus 185 cfs of pumped flow, equalling 406 cfs.

The estimated oxygen transfer rate at standard conditions (SOF) is 1,144 pounds of oxygen per hour, assuming that a 50% oxygen transfer efficiency is attained at the 25-foot depth.

The standard oxygen transfer efficiency equals:

$$\frac{1{,}144 \text{ lbs O}_2/\text{hr}}{61 \text{ bhp} + 21 \text{ bhp} + 46 \text{ bhp}} = \frac{1{,}144 \text{ lbs O}_2/\text{hr}}{128 \text{ bhp}} =$$

8.94 lbs O₂/hr/bhp.

The expected aerator flood point in terms of air flow rate through the sparge is 540 scfm as compared to the total air flow rate of 2,210 scfm sparged and jetted into the total liquor flow into the deep oxygen contact duct.

Figure 12:
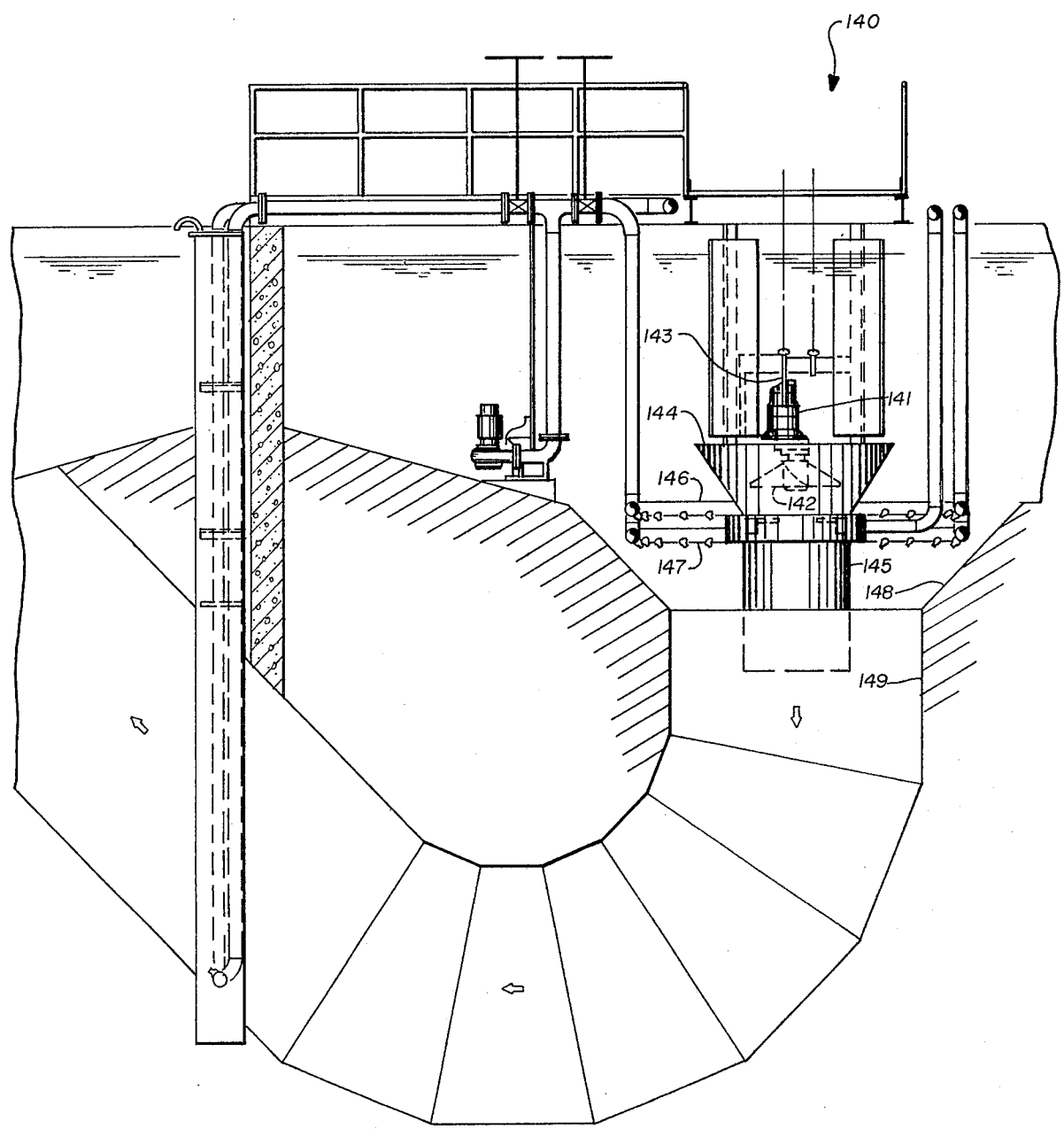
FIG. 12 is a sectional elevational view of a circulator/aerator which is like the apparatus of FIG. 8 except that it uses a relatively high speed propeller, a submersible motor, and a smaller draft tube.

The draft-tube circulator/aerator 140, with a submersible pump and an annular inlet end for its deep oxygen contact duct, as shown in FIG. 12, comprises a submersible motor 141 and propeller 142 which are mounted on a support 143 and disposed within a funnel 144 atop a draft tube 145. Circulator/aerator 140 further comprises an upper eddy-jet header 146, a lower eddy-jet header 147, and a deep oxygen contact duct 149 having a large duct inlet cone 148. Duct 149 has the annular area defined by the respective circular tube and duct walls 145 and 149 as its intervening inlet zone. Assuming therefore, as compared to the extended-shaft embodiment of FIGS. 8–11, this embodiment tends to have a larger proportion of induced flow entering its duct 149.

The submersible liquor pump, comprising submersible motor 141 and propeller 142, is suitably a Flygt 4500 Submersible Mixer of suitable horsepower which typically rotates at 250–430 rpm, as contrasted to the draft tube aerator of FIGS. 8–11, for example, which typically rotates at 85–200 rpm. The Flygt mixer is sold by the Flygt Corporation of Norwalk, Conn.

The barriered circulator/aerator 150, with an extended-shaft pump and an open-ended deep contact duct, as shown in FIGS. 13 and 15, comprises a shaft 151, a propeller 152, a single air/liquor eddy jet header 153, a circumferential air distribution duct 154, a sparge ring 155, a duct inlet cone 156, and a deep oxygen contact duct having interior wall 157. Its central inlet zone is not defined sharply but is roughly coincident with the blade tips of propeller 152 while in operation. A jetted air/liquor mixture 158 is sent directly downward, from the intervening inlet zone and parallel to duct wall 157, by the eddy jets. Air flows 159, as shown in FIG. 10, move horizontally and inwardly to intercept directly pumped liquor flows 159, in the central inlet zone.

Figure 14:
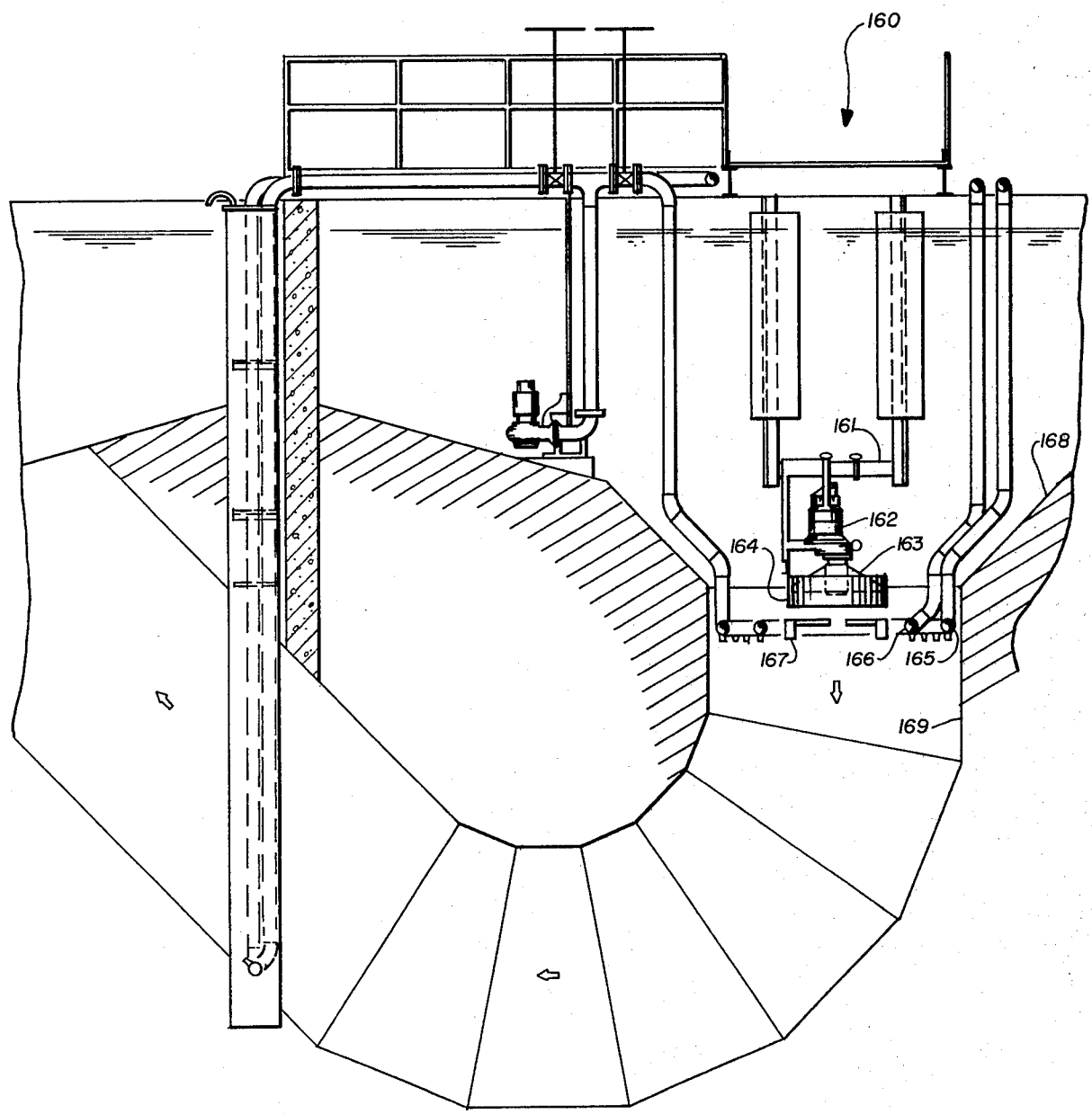
FIG. 14 is a sectional elevational view of a circulator/aerator which is like the apparatus of FIG. 8 except that it uses a submersible motor and a relatively high speed propeller and uses no draft tube.
Figure 16:
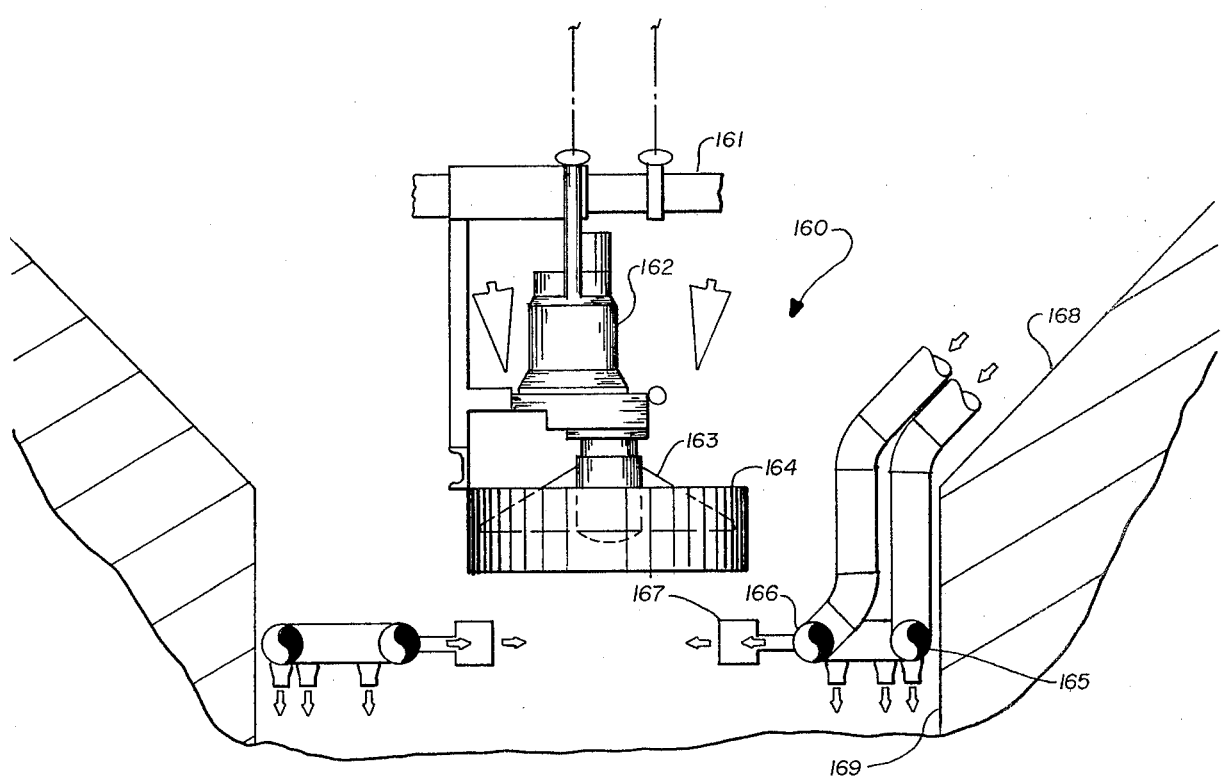
FIG. 16 is a detailed sectional elevation of the propeller, sparge ring, circumferential air distribution duct, and single air/liquor header of FIG. 14.

The barriered circulator/aerator 160, with a submersible pump and an open inlet end for its deep oxygen contact duct, as shown in FIGS. 14 and 16, comprises a pump support member 161, a submersible pump 162, a propeller 163, a propeller shroud 164 which defines the central liquor inlet zone, a single air/liquor header 165, a circumferential air duct 166, a sparge ring 167, a large inlet cone 168 which defines the outer limit of the intervening inlet zone, and deep contact duct walls 169.

These three design examples (Examples 3, 4, and 5) indicate that the preferred combination of the pump/aerator with the jet-equipped annular inlet for utilization of kinetic energy within the intake channel can provide oxygen transfer efficiencies that are from 1.6 to 2.2 as great per bhp as that attainable by the 100% pumped-flow design of the total barrier oxidation ditch as seen in FIG. 7. Even if no additional compressed air is supplied in excess of the normal air sparge capacity of the draft tube aerator, the apparatus and method of this invention enables all of the energy-release induced flow and all of the directly pumped flow from central liquor inlet zone (typically defined by the funnel of the draft tube) to enter the deep oxygen contact duct, thereby providing point source aeration and oxygen transfer under increased hydraulic pressure (e.g., 25 feet) without having to pass energy-release flow through the barrier or under a partial barrier or baffle without aeration or with relatively inefficient aeration and then blending it with highly aerated liquor in the discharge channel.

Figure 8:
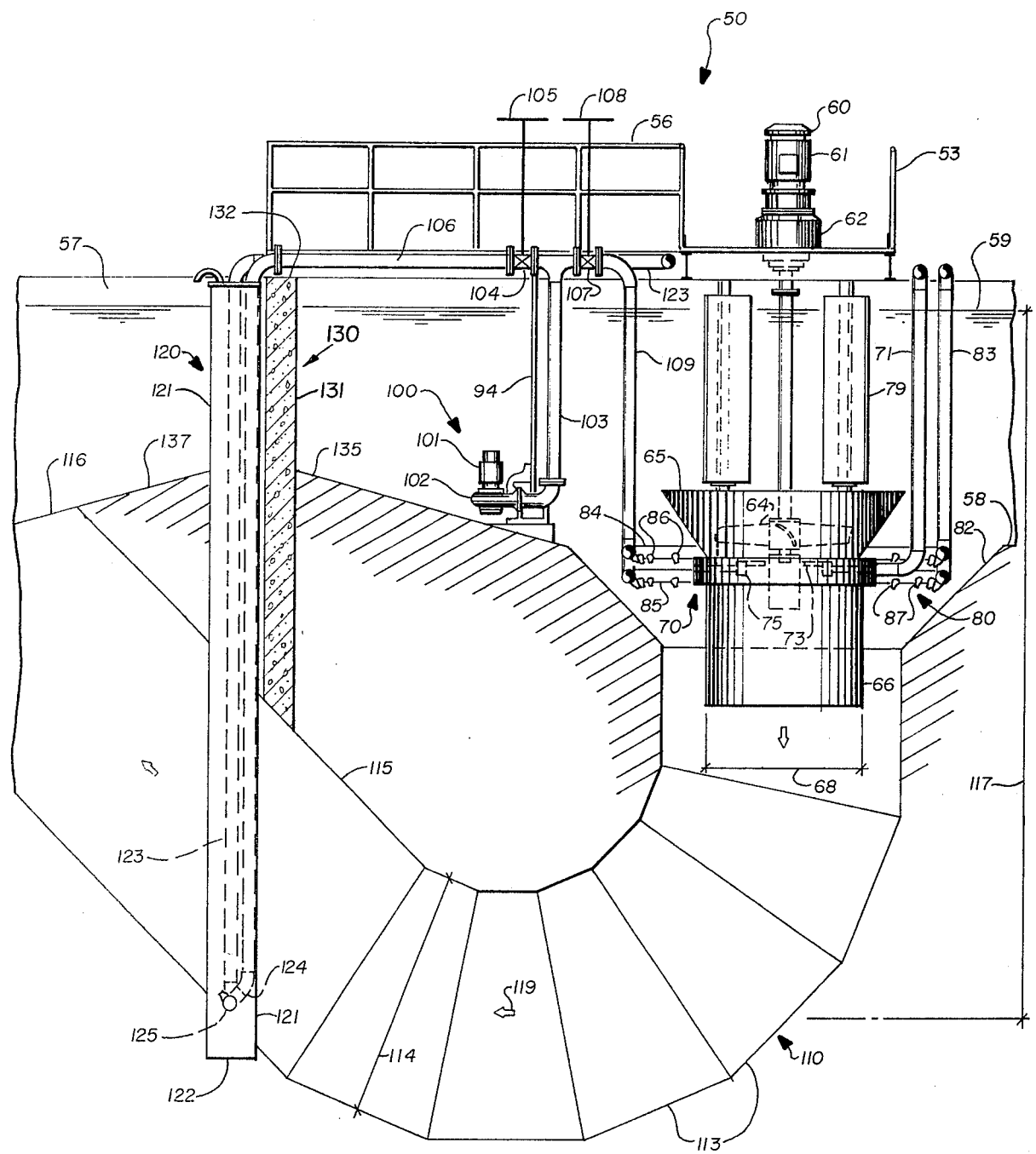
FIG. 8 is a sectional elevational view of a barriered circulator/aerator which is disposed in the endless channel of a barrier oxidation ditch. It comprises a deep contact duct, shaped generally as a "J", which passes beneath and discharges beyond a barrier, a coaxially disposed downdraft tube of smaller diameter, a coaxially disposed propeller therewithin, an air sparge disposed within the downdraft tube and beneath the propeller, a pair of circular air/liquor headers having a plurality of eddy jet diffusers attached thereto and directed downwardly and inwardly into the annular space between the duct and the downdraft tube, and a removable eddy jet diffuser system within its duct.
Figure 9:
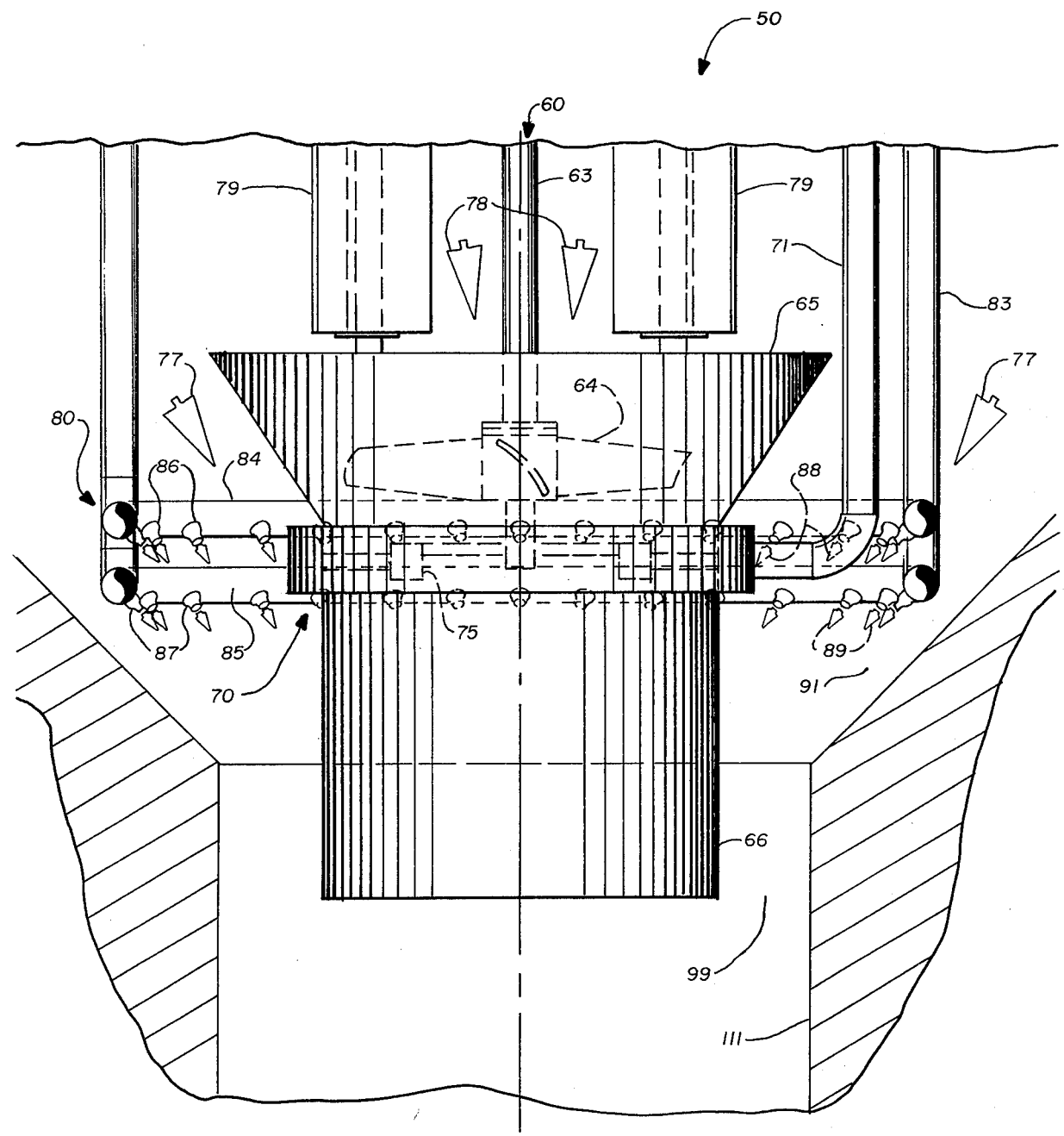
FIG. 9 is an enlarged view, as a sectional elevation, of a portion of the circulator/aerator of FIG. 8, showing the downdraft tube, propeller, air/liquor headers, and air sparge in detail.

The barriered circulator/aerator 140 shown in FIG. 12 comprises a submersible motor 141, a relatively high speed propeller 142, a motor support 143, a funnel 144, a draft tube 145 equipped with a circumferential air duct and sparge ring, an upper air/liquor header 146, a lower air/liquor header 147, a deep oxygen contact duct 148, and a large duct inlet cone 149. The apparatus is also equipped, as seen in FIG. 8, with anti-vortex baffles, a submersible liquor pump, and air and liquor supply lines. This embodiment is notable for the relatively small diameter draft tube 145 which creates its central inlet zone, high-speed discharge flow from draft tube 145, and large intervening spaces between cones 142 and 148 and between cylinders As in the embodiment of FIGS. 13 and 15, the jetted air/liquor mixture is sent directly downward, as a peripheral curtain adjacent to wall 169, and the air from sparge ring 167 is sent inwardly and horizontally for intercepting the directly pumped flow.

Figure 17:
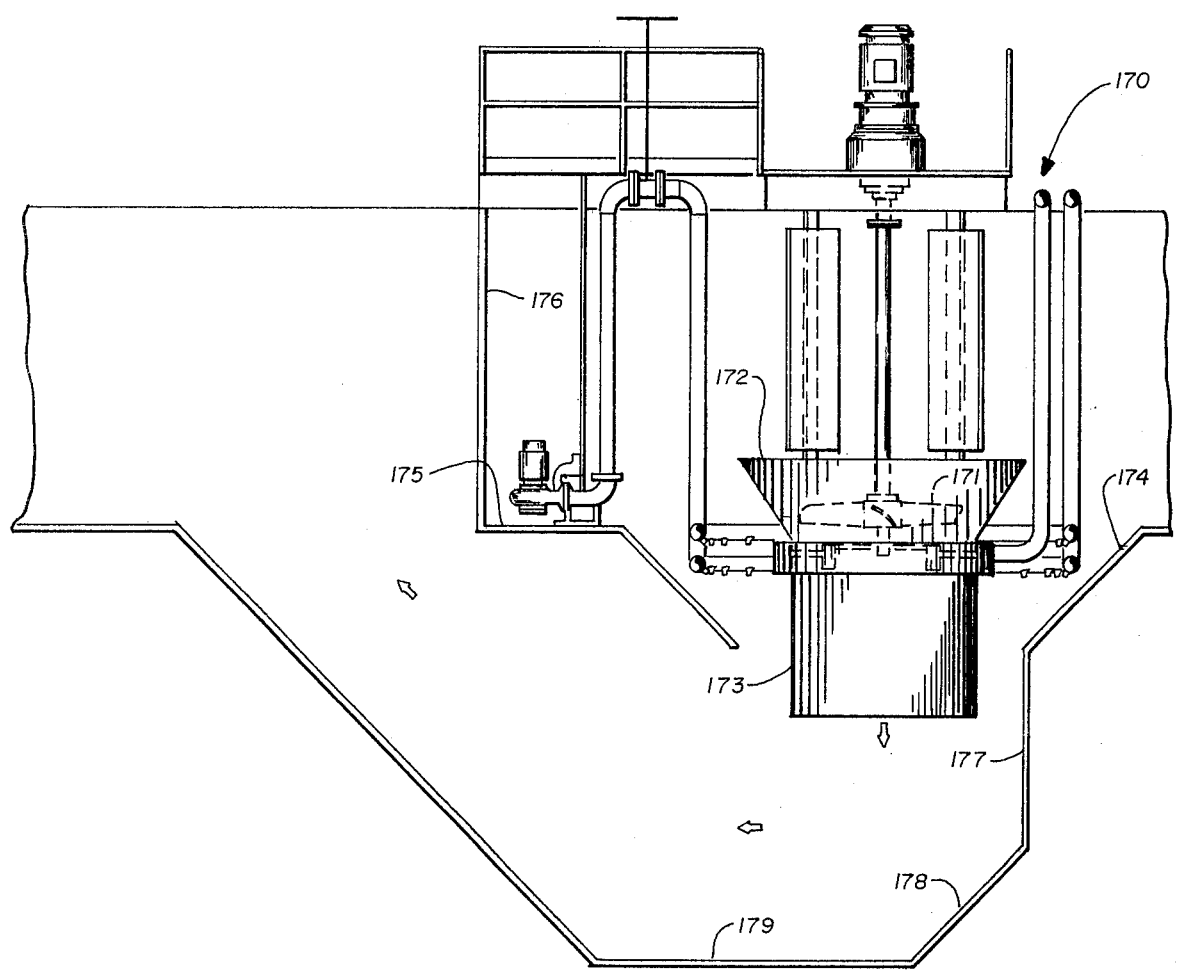
FIG. 17 is a sectional elevational view of a barriered circulator/aerator which is intended for use in a very large barrier oxidation ditch having its barrier, bottom, sides, and duct formed from concrete slabs, except for its funnel outside of and concentric with its draft tube.

FIG. 17 shows a barriered circulator/aerator having a draft tube inlet funnel which clearly defines the central liquor inlet zone, a draft tube, and a duct inlet funnel which defines the outer limits of the intervening inlet zone, but the entire construction is by slab manufacturing methods. It is particularly suitable for very large barrier oxidation ditches. This circulator/aerator comprises a propeller 171, a funnel 172, a draft tube 173, a single air/liquor eddy jet header, an air distribution duct, a conical inlet 174, a horizontal barrier 175, a vertical barrier 176, an upstream wall 177, a deflecting surface 178 for receiving and deflecting a portion of the induced and directly pumped flows toward the passageway beneath horizontal barrier 177, and a bottom 179 of this passageway.

Figure 18:
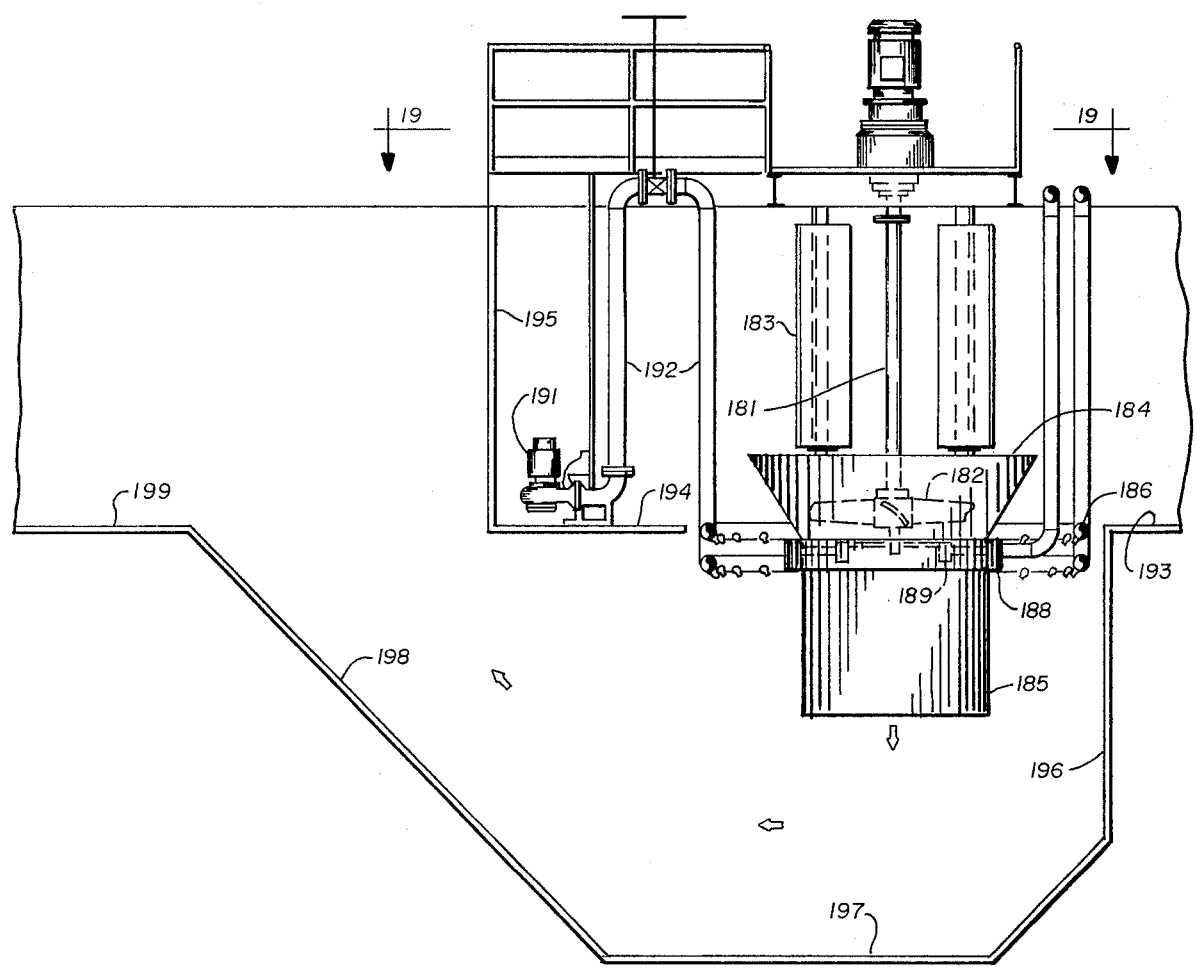
FIG. 18 is a sectional elevational view of a barriered circulator/aerator which is like the apparatus of FIG. 17 except that it is disposed within a circular opening in the floor of the intake channel and surrounding the draft tube, instead of being within the concrete funnel of FIG. 17.
Figure 19:
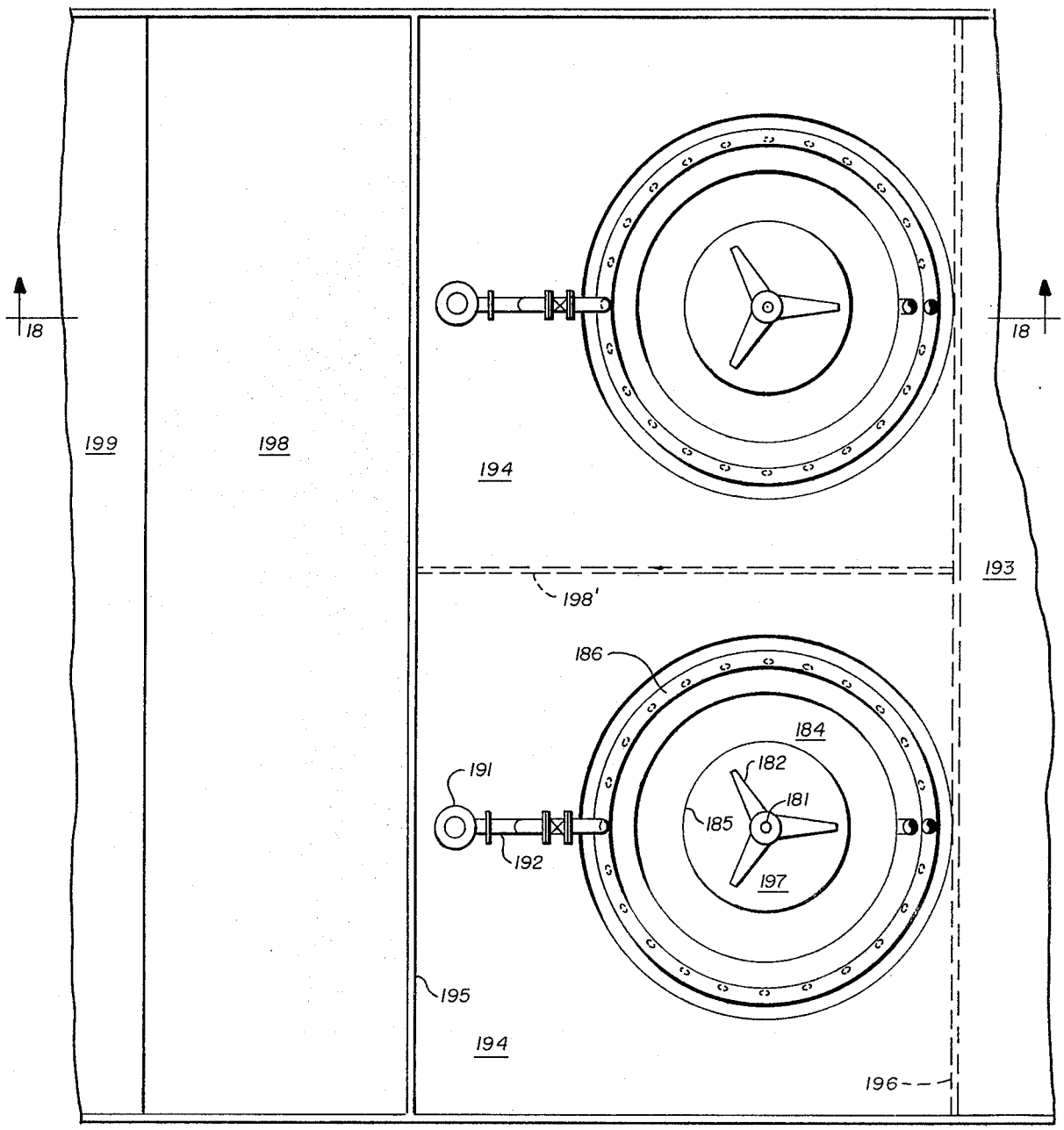
FIG. 19 is a top view of the circulator/aerator of FIG. 18, showing two of these circulators/aerators disposed in parallel, with a supporting concrete wall disposed therebetween.

FIGS. 18 and 19 show a very similar slab-sided, barriered embodiment of a circulator/aerator having a long-shaft propeller. This embodiment, however, has no conical inlet to its discharge passageway. Instead, its horizontal barrier 194 forms a circular opening which is disposed around but spaced from its draft tube 185 and funnel 184, so that its intervening inlet zone is between this circular opening and funnel 184. Specifically, this circulator/aerator 180 comprises a long shaft 181, a propeller 182, anti-vortex baffles 183, a funnel 184, a draft tube 185, an upper air/liquor eddy jet header 186, a lower air/liquor eddy jet header 187, a circumferential air dict 188, a sparge ring 189, a submersible liquor pump 191, liquor delivery line 192 to the headers, horizontal barrier 194 which is a lateral extension of channel bottom 193, vertical barrier 195, upstream wall 196 of the discharge passage, bottom 197 of the passage, and inclined discharge surface 198 which is connected to bottom 199 of the discharge channel.

It should be noted that vertically disposed partition 198' supports horizontal barrier 194. This embodiment is also suitable for very large barrier oxidation ditches. It is very simple to construct. The entire apparatus can be readily lifted from the circular openings in horizontal barrier 194 for repair and replacement.

What is claimed is:

1. A circulator/aerator in a barrier oxidation ditch which has an endless channel, containing translationally circulating mixed liquor, and a barrier which is sealably disposed across said endless channel, to separate upstream liquor within an intake channel from downstream liquor within a discharge channel, comprising:
   A. a deep oxygen contact duct which has an inlet connected to said intake channel and a discharge end connected to said discharge channel, said contact duct being disposed to pass beneath said barrier at a selected maximum depth;
   B. a pump/aerator which comprises:
      (1) a central liquor inlet which is in flow connection with said inlet end of said contact duct,
      (2) a downdraft propeller which is rotatably and coaxially disposed within said central inlet, and
      (3) an air sparge means which is disposed beneath said propeller;
   C. an induced-flow means which comprises:
      (1) an intervening inlet which is disposed around said central inlet and is in flow connection with said inlet end of said contact duct, and
      (2) an air diffuser, means, comprising at least one air header or an eddy jet header, which is disposed within said intervening inlet, and which is disposed to discharge within said inlet end of said contact duct; and
   D. an air compressing means and an air supply means which is flow connected thereto and to said air sparge means and to said air diffuser means.

2. The circulator/aerator of claim 1, wherein said air diffuser header or eddy jet header is removably disposed within said duct and at a depth less than said maximum depth.

3. The circulator/aerator of claim 2, wherein said removable air diffuser means within said contact duct comprises eddy jets.

4. The circulator/aerator of claim 1, wherein said air diffuser means comprises at least one air/liquor header which is flow connected to said air supply means.

5. The circulator/aerator of claim 4, wherein said at least one air/liquor header consists of two said headers in vertically disposed relationship.

6. The circulator/aerator of claims 4 or 5, wherein a plurality of eddy jets are attached and flow connected to said at least one air/liquor header and a liquor pump is flow connected to said at least one air/liquor header.

7. The circulator/aerator of claim 6, wherein said inlet end of said contact duct is conical in shape.

8. The circulator/aerator of claim 7, wherein said central liquor inlet is defined by the funnel of a downdraft tube surrounding said propeller, whereby said intervening inlet is between said funnel and said conical inlet end of said contact duct.

9. The circulator/aerator of claim 8, wherein said contact duct is constructed with concrete slabs.

10. The circulator/aerator of claim 9, wherein said propeller is at the end of a long shaft attached to a motor above said mixed liquor.

11. The circulator/aerator of claim 9, wherein said propeller is attached to a submersible motor.

12. The circulator/aerator of claim 6, wherein said inlet end is circular in shape.

13. The circulator/aerator of claim 12, wherein said contact duct is constructed of concrete slabs.

14. A method for providing induced flow of mixed liquor and pressurized aeration of both directly pumped liquor and said induced-flow liquor in a barrier oxidation ditch having a sealably attached barrier athwart its endless channel, to separate upstream liquor within an intake channel from downstream liquor within a discharge channel, and having a deep oxygen contact duct, connecting said intake channel to said discharge channel which is disposed beneath said barrier, said method comprising the following steps:
   A. providing a directly pumped central liquor inlet which is in flow communication with said intake channel and with said contact duct;
   B. providing an induced-flow liquor inlet which is in flow communication with said intake channel and said contact duct and is in surrounding relationship to said central liquor inlet;

C. providing a downdraft propeller which is rotatably and coaxially mounted to said central liquor inlet;

D. pumping said upstream liquor downwardly with said downdraft propeller from said intake channel into said deep oxygen contact duct to create directly pumped liquor entering said contact duct;

E. providing:
  (1) a compressed air supply means,
  (2) an air sparge means which is disposed beneath said propeller and is flow connected to said compressed air supply means, and
  (3) an air diffuser means which is disposed within said induced-flow liquor inlet and is in flow communication with said compressed air supply means;

F. selectively admixing diffused air from said air sparge means and said air diffuser means with at least one of said directly pumped liquor and said induced-flow liquor to create a combined liquor-air mixture within said contact duct; and G. moving said combined liquor-air mixture through said contact duct, wherein said pressurized aeration occurs by homogeneous aeration of both said induced-flow liquor and said directly pumped liquor with said diffused air, and into said discharge channel as aerated mixed liquor which flows translationally, while the dissolved oxygen content thereof is consumed, through said endless channel and piles up against said barrier with dammed-up momentum, whereby kinetic energy is available to provide said induced flow.

* * * * *